(12) United States Patent
Kiely et al.

(10) Patent No.: US 7,723,623 B2
(45) Date of Patent: May 25, 2010

(54) ELECTRICAL DUPLEX CONNECTOR HAVING AN INTEGRALLY FORMED CONNECTOR BODY WITH A FRUSTRO-CONICAL RETAINING RING AND UNIDIRECTIONAL CABLE RETAINERS

(75) Inventors: Kenneth M. Kiely, Milford, CT (US); Delbert Auray, Southport, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 12/006,946

(22) Filed: Jan. 8, 2008

(65) Prior Publication Data

US 2008/0149388 A1    Jun. 26, 2008

Related U.S. Application Data

(63) Continuation-in-part of application No. 11/903,410, filed on Sep. 21, 2007, which is a continuation-in-part of application No. 11/501,131, filed on Aug. 8, 2006, now Pat. No. 7,488,905, which is a continuation-in-part of application No. 11/403,099, filed on Apr. 12, 2006, now Pat. No. 7,151,223, which is a continuation-in-part of application No. 11/400,606, filed on Apr. 7, 2006, now Pat. No. 7,154,042, which is a continuation-in-part of application No. 11/364,435, filed on Feb. 28, 2006, now Pat. No. 7,205,489, which is a continuation-in-part of application No. 11/258,990, filed on Oct. 26, 2005, now Pat. No. 7,057,107, which is a continuation-in-part of application No. 11/151,374, filed on Jun. 13, 2005, now Pat. No. 7,075,007, which is a continuation-in-part of application No. 11/100,250, filed on Apr. 6, 2005, now Pat. No. 7,064,272, which is a continuation-in-part of application No. 10/939,619, filed on Sep. 13, 2004, now Pat. No. 6,916,988.

(51) Int. Cl.
*H02G 3/06* (2006.01)
(52) U.S. Cl. .................. 174/666; 174/650; 174/656; 174/659; 439/557
(58) Field of Classification Search ................. 174/666, 174/650, 659, 656, 665, 68.1, 68.3, 72 C, 174/69, 71 R, 664, 70 R; 439/92, 142, 320, 439/557, 552, 587; 403/197
See application file for complete search history.

(56) References Cited

U.S. PATENT DOCUMENTS 1,296,304 A    2/1919    Grindle
1,328,290 A    1/1920    Overbagh (Continued)

*Primary Examiner*—Angel R Estrada
(74) *Attorney, Agent, or Firm*—Fattibene and Fattibene; Paul A. Fattibene

(57) ABSTRACT

This disclosure is directed to electrical connectors, and more specifically to a duplex or multiplex electrical connector having an integrally formed connector body having an inlet end portion defining a plurality of passageways for receiving a cable, and an outlet end portion wherein the outlet end portion is provided with an outer surface that slopes downwardly toward the outlet opening and having a complementary sloping or frustro-conical, snap fit, outer, retaining ring with locking tangs and grounding tangs for snap locking the outlet end portion of the connector to an electric box or panel, and including a unidirectional cable retaining sleeve disposed within each of the inlet bores or passageways which are firmly secured therein in a predetermined oriented position relative to the respective passageway, and having a non-conducting bushing sandwiched between the outlet end opening and the outer frustro-conical retaining ring.

10 Claims, 18 Drawing Sheets

U.S. PATENT DOCUMENTS

| | | |
|---|---|---|
| 1,483,218 A | 2/1924 | Fahnestock |
| 1,725,883 A | 8/1929 | Recker |
| 1,830,250 A | 11/1931 | Tiefenbacher |
| 2,084,961 A | 6/1937 | Bondson |
| 2,156,003 A | 4/1939 | Tinnerman |
| 2,160,353 A | 5/1939 | Conners |
| 2,445,663 A | 7/1948 | Peters |
| 2,744,769 A | 5/1956 | Roeder et al. |
| 2,749,148 A | 6/1956 | Schneiderman |
| 2,823,932 A | 2/1958 | Schigut |
| 3,183,297 A | 5/1965 | Curtiss |
| 3,436,105 A | 4/1969 | Miklya |
| 3,544,705 A | 12/1970 | Winston |
| 3,631,738 A | 1/1972 | Harper |
| 3,788,582 A | 1/1974 | Swanquist |
| 3,814,467 A | 6/1974 | Van Buren, Jr. |
| 3,858,151 A | 12/1974 | Paskert |
| 3,993,333 A | 11/1976 | Biswas |
| 4,012,578 A | 3/1977 | Moran et al. |
| 4,021,604 A | 5/1977 | Dola et al. |
| 4,032,178 A | 6/1977 | Neuroth |
| 4,248,459 A | 2/1981 | Pate et al. |
| 4,361,302 A | 11/1982 | Lass |
| 4,468,535 A | 8/1984 | Law |
| 4,619,332 A | 10/1986 | Sheehan |
| 4,621,166 A | 11/1986 | Neuroth |
| 4,626,620 A | 12/1986 | Plyler |
| 4,657,212 A | 4/1987 | Gilmore et al. |
| 4,711,472 A | 12/1987 | Schnell |
| 4,773,280 A | 9/1988 | Baumgarten |
| 4,880,387 A | 11/1989 | Stikeleather et al. |
| 4,981,310 A | 1/1991 | Belisaire |
| 4,990,721 A | 2/1991 | Sheehan |
| 5,132,493 A | 7/1992 | Sheehan |
| 5,171,164 A | 12/1992 | O'Neil et al. |
| 5,189,258 A | 2/1993 | Pratesi |
| 5,266,050 A | 11/1993 | O'Neil et al. |
| 5,342,994 A | 8/1994 | Pratesi |
| 5,422,437 A | 6/1995 | Schnell |
| 6,034,326 A | 3/2000 | Jorgensen |
| 6,043,432 A | 3/2000 | Gretz |
| 6,080,933 A | 6/2000 | Gretz |
| 6,114,630 A | 9/2000 | Gretz |
| 6,133,529 A | 10/2000 | Gretz |
| 6,194,661 B1 | 2/2001 | Gretz |
| 6,335,488 B1 | 1/2002 | Gretz |
| 6,352,439 B1 | 3/2002 | Stark et al. |
| 6,355,884 B1 | 3/2002 | Gretz |
| 6,380,483 B1 | 4/2002 | Blake |
| 6,444,907 B1 | 9/2002 | Kiely |
| 6,476,322 B1 | 11/2002 | Dunne et al. |
| 6,521,831 B1 | 2/2003 | Gretz |
| D473,783 S | 4/2003 | Kiely |
| 6,555,750 B2 | 4/2003 | Kiely |
| 6,604,400 B1 | 8/2003 | Gretz |
| D479,984 S | 9/2003 | Kiely |
| 6,670,553 B1 | 12/2003 | Gretz |
| 6,682,355 B1 | 1/2004 | Gretz |
| 6,737,584 B1 | 5/2004 | Kiely |
| 6,768,057 B2 | 7/2004 | Blake |
| 6,780,029 B1 | 8/2004 | Gretz |
| 6,849,803 B1 | 2/2005 | Gretz |
| 6,860,758 B1 | 3/2005 | Kiely |
| 6,872,886 B2 | 3/2005 | Kiely |
| 6,916,988 B1 | 7/2005 | Auray et al. |

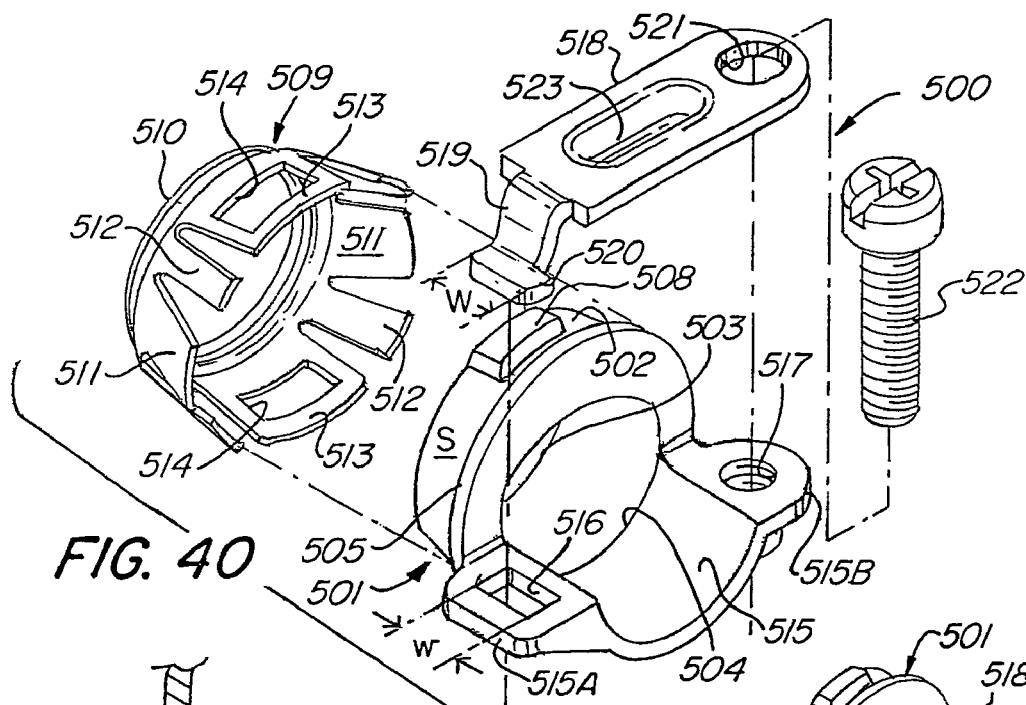
FIG. 40
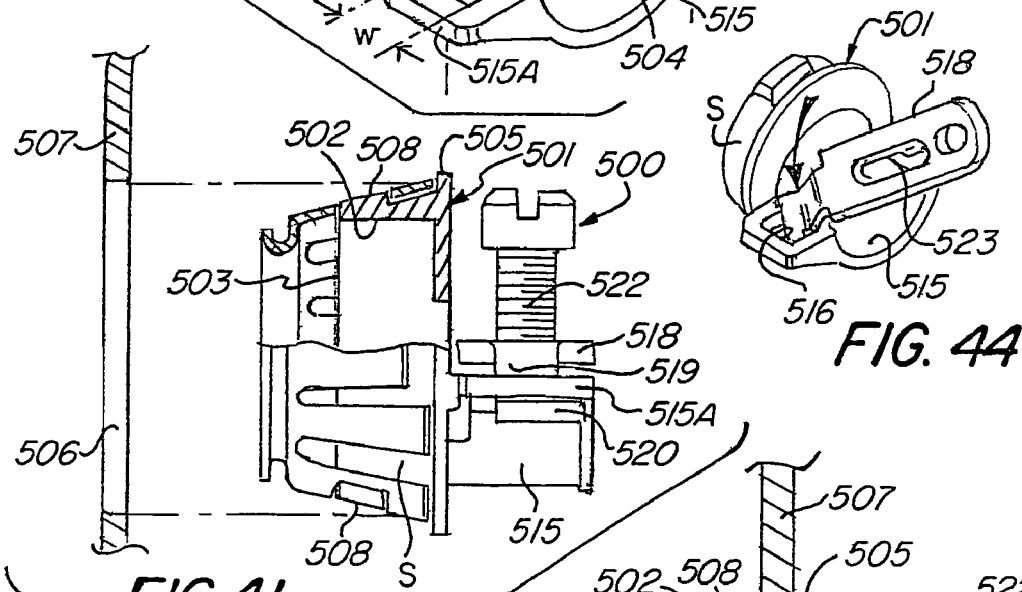
FIG. 41
FIG. 44
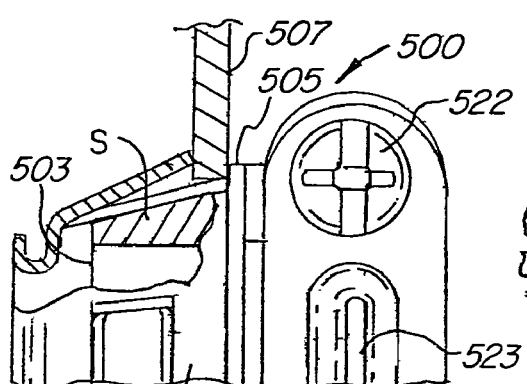
FIG. 43
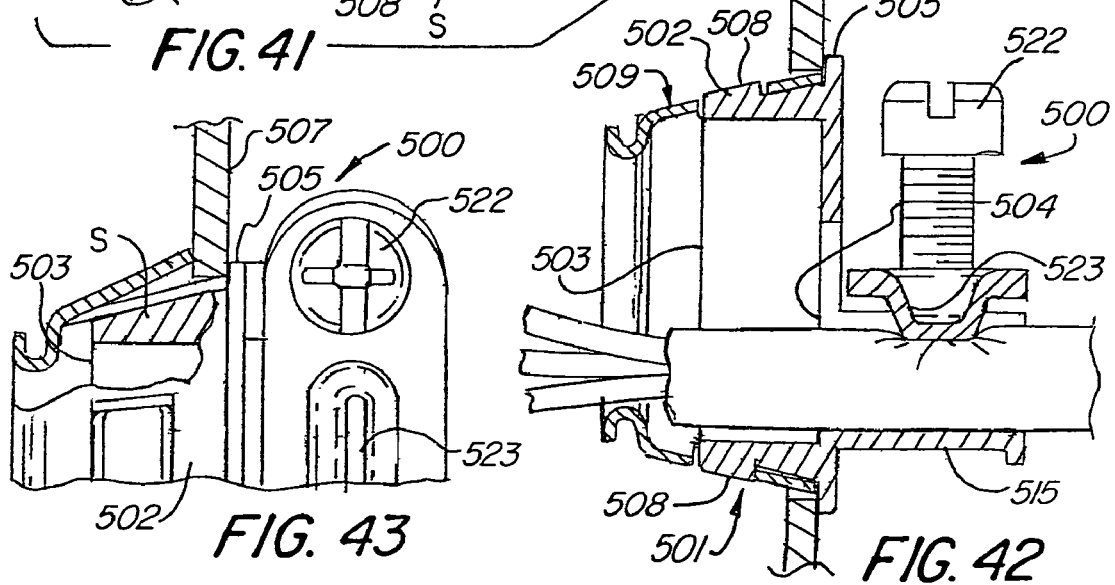
FIG. 42

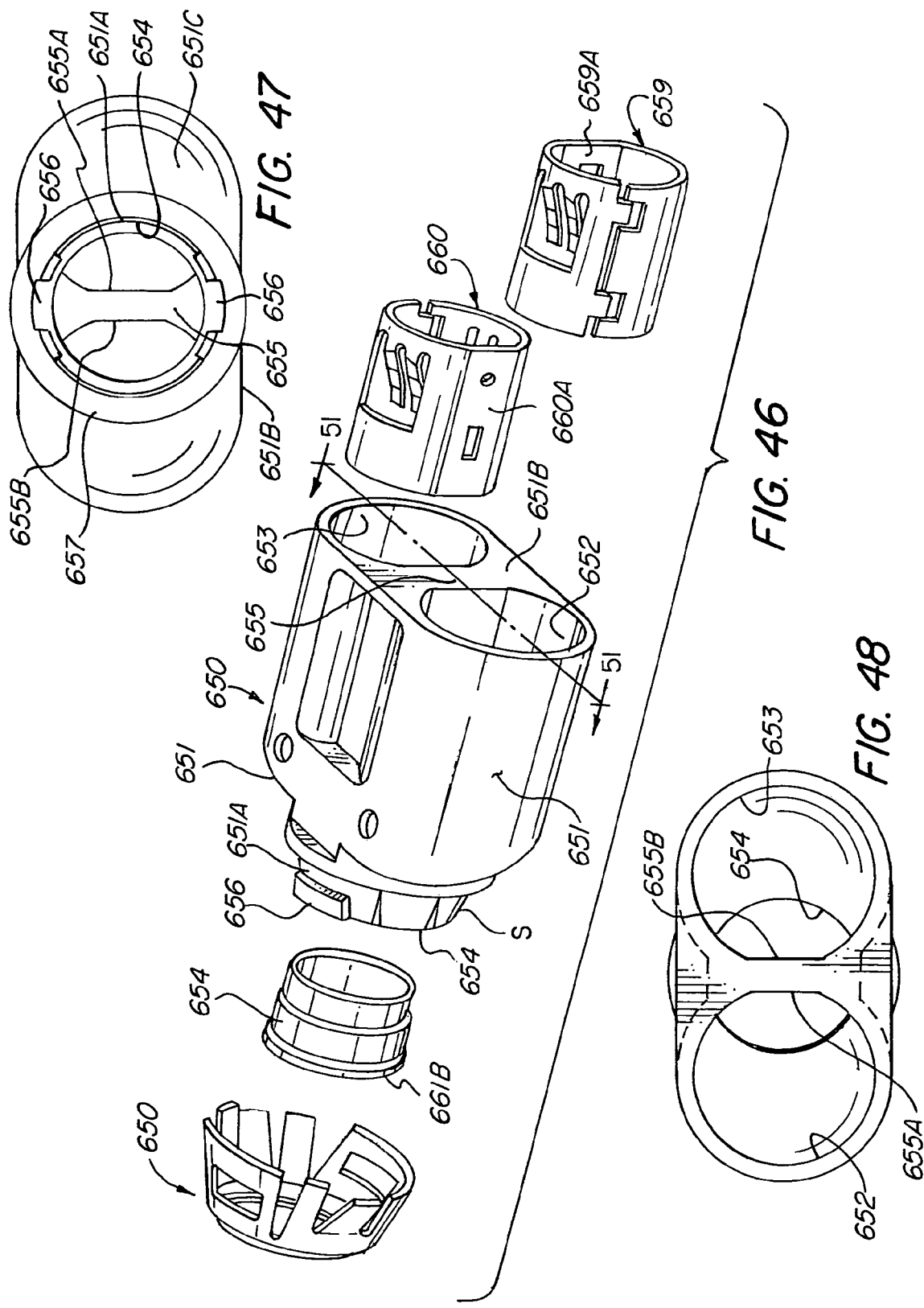

ELECTRICAL DUPLEX CONNECTOR HAVING AN INTEGRALLY FORMED CONNECTOR BODY WITH A FRUSTRO-CONICAL RETAINING RING AND UNIDIRECTIONAL CABLE RETAINERS

RELATED APPLICATIONS

This application is a continuation in part of application having Ser. No. 11/903,410 filed Sep. 21, 2007 which is a continuation in part application of application Ser. No. 11/501,131 filed Aug. 8, 2006 now U.S. Pat. No. 7,488,905 for Electrical Connector With Outer Retainer Ring and Internal Unidirectional Conductor Retainer, which is a continuation in part application of application Ser. No. 11/403,099 filed Apr. 12, 2006 for Snap Fit Electrical Connector Assembly With Frustro Conical Retainer Ring And Internal Unidirectional Snap Fit Wire Conductor Retainer, now U.S. Pat. No. 7,151,223, which is a continuation in part application of application Ser. No. 11/400,606 filed Apr. 7, 2006 for Electrical Connector With Frustro Conical Snap Fit Retainer Ring Constructed To Enhance The Insertion Of The Connector Through A Knockout Hole Of An Electric Box, now U.S. Pat. No. 7,154,042, which is a continuation in part application of application Ser. No. 11/364,435 filed Feb. 28, 2006 for Snap-Fit Electrical Connector Assembly For Facilitating The Connection of the Electric Connector Assembly To An Electric Box, now U.S. Pat. No. 7,205,489, which is a continuation in part of application Ser. No. 11/258,990 filed Oct. 26, 2005, now U.S. Pat. No. 7,057,100, which is a continuation in part of application Ser. No. 11/151,374 filed Jun. 13, 2005 for Snap Fit Electrical Connector Assembly With Conical Outer Snap Fit Retainer And One Or More Internal Snap Fit Wire Retainers, now U.S. Pat. No. 7,075,007, which is a continuation in part of application Ser. No. 11/100,250 filed Apr. 6, 2005 for Snap In Electrical Connector Assembly With Unidirectional Wire Conductor Retainer Ring, now U.S. Pat. No. 7,064,272, which is a continuation in part application of application Ser. No. 10/939,619 filed Sep. 13, 2004 for Electrical Connector With Frustro Conical Snap Fit Retaining Ring, now U.S. Pat. No. 6,916,988 B1, each of which is incorporated herein by reference.

FIELD OF THE INVENTION

This invention is directed to a further advancement in the field of electrical connector assemblies having a snap fit retaining ring circumscribing the outlet end of a connector body for effecting a snap fit connection to an electrical box of the types described in U.S. Pat. No. 6,860,758, U.S. Pat. No. 6,935,891. More specifically, this application is directed to further improvements in duplex type electrical connector assemblies.

BACKGROUND OF THE INVENTION

Electrical connectors are commonly used for attaching electrical conductors, cables, wires, electrical metal tubing (EMT) or the like to an electric box, e.g. a junction box, outlet box, switch box, fuse box, or other similar type of electric box or panel. Such known electrical connectors are either of a type that are secured to an electric box by a threaded lock nut or by means of a conventional circular snap fit retaining ring of the type disclosed in U.S. Pat. Nos. 6,860,758; 6,444,907; 5,189, 258; 5,266,050; 5,171,164; 2,744,769 and 1,483,218 for example. Reference is also made to U.S. Pat. No. 6,768,057 which is directed to a right angle type connector formed of a pair of sheet metal stampings fitted together and secured to an electrical box with a snap fit arrangement.

Also known are connectors formed as connector caps which are adapted to be fitted over the end of a conductor, cable or wires, such as disclosed in U.S. Pat. No. 4,880,387. Various other known efforts to facilitate the connection of an electrical conductor to an electric box are evidenced by U.S. Pat. Nos. 6,043,432; 6,080,933; 6,114,630; 6,133,529; 6,194, 661; 6,335,488; 6,352,439; 6,355,884; 6,444,907; 6,555,750; 6,604,400; 6,670,553; 6,737,584; 6,682,355; 6,780,029 and 6,849,803.

Notwithstanding the extensive background relating to electrical connectors, continuing efforts are being made to improve, simplify and/or reduce the cost and/or complexity of the known connectors in an effort to advance the electrical connector art. This disclosure is directed to such efforts.

SUMMARY OF THE INVENTION

An object of this invention is to provide a duplex type electrical connector assembly having an integral or unitary connector body provided with an outer frustro-conical retainer and an internal unidirectional cable retainer.

An object of this invention is to provide an electrical connector with a frustro-conically shaped external retaining ring having a leading edge and a trailing edge and integrally formed outwardly sprung locking tangs that can be readily connected to a knock-hole of an electric box, panel or enclosure with a snap-fit wherein the trailing edge functions as the electrical ground between the electrical box and the connector assembly.

Another object of this invention is to provide for an electrical connector assembly that includes an electrical connector body having an outlet end with a frustro-conical outer surface for receiving thereon a complementary frustro-conical retaining ring that is readily fitted to and retained on the outlet end portion of the connector body.

Another object is to provide a connector assembly comprising a connector body having an outlet end free of any locking ring retaining flange and an associated externally circumscribing snap fit retainer circumscribing the flangeless outlet end in a secured manner.

Another object is to provide a retaining ring, adapted to be fitted onto the outlet end of an integrally formed duplex connector body whereby the retainer ring is frustro-conical in shape having a first series of tangs for securing the connector body to an electrical box and a trailing edge or tang for affecting a positive electrical ground with an associated electrical box.

Another object is to provide an electrical connector assembly having a connector body with a frustro-conical outer retainer ring circumscribing the outer surface of the connector body outlet end and having a conductor retainer in the form of a saddle connected to the connector body with a cable retaining strap hingedly connected to one end of the saddle for securing either a nonmetallic or armor metal clad cable thereto.

Another object of this invention is to provide a strap type electrical connector having a cable retainer in the form of a saddle for supporting a conductor, wire, or cable thereon and a readily detachable strap hingedly connected to one end of the saddle in a manner that prohibits unintentional detachment of the strap from the saddle.

Another object of this invention is to provide a simplified duplex connector assembly having a connector body integrally formed consisting of a suitable metallic alloy defining at least a pair of parallel passageways arranged to receive and retain therein a unidirectional cable retainer in a predetermined oriented position, and having an outer frustro-conical retainer for snap fitting the duplex connector to an electric box or panel.

Another object is to provide a duplex type electrical connector assembly that is relatively simple to fabricate, positive in operation, and economical to produce and sell.

The foregoing objects and other features and advantages are attained by an electrical duplex connector assembly that includes an integrally formed connector body having a single outlet end adapted to be secured to a knock-out hole of an electric box or panel, and having at least a pair of passageways defining an inlet end. A radially outwardly extending flange circumscribes the outlet end of the integral connector body to function as a stop to limit the insertion of the outlet end portion of the integral connector body through the knockout hole of an electric box or panel. The outlet end portion of the connector body is provided with an outer surface that converges or tapers inwardly toward the outlet opening thereof. Formed on the surface of the outlet end portion are one or more retaining lugs, which may be circumferentially spaced about the outlet end portion. A frustro-conically shaped, snap-fit retainer is fitted onto the outlet end portion of the connector body.

The frustro-conical retainer is formed from a blank of sheet material, e.g. spring steel or the like, having a cruciform shape that includes a face portion or simply a central opening wherein the radiating arms of the cruciform blank are disposed about the face portion or central opening to define a frustro-conical ring or cup shape. The retainer ring or cup so formed is provided with blanked out or die cut tangs to define outwardly bent locking tangs. The trailing edge of the frustro-conical ring or cup provides for electrical grounding in the assembly of the electrical connector to an electric box or panel.

The frustro-conical ring so formed also has a slot adapted to receive a retaining lug when the retaining ring is fitted onto the outlet end of the connector body so that the free or trailing edges of the ring or cup define a grounding edge or tang that engages the inner periphery of the knockout hole of an electric box or panel for effecting positive electrical continuity and grounding.

To form the retaining ring, the cruciform arms are arranged to be folded relative to the central opening or face forming portion that circumscribes the central opening, to define a unitary frustro-conically shaped cup-like member or ring to compliment or be fitted onto the outlet end portion of the connector body. The retaining ring thus formed is fitted over or onto the outlet end portion of the connector body whereby the retaining slot formed in the ring is adapted to receive the complementary retaining lug formed on the surface of the outlet end portion for retaining or securing the ring on the outlet end portion of the connector body.

With the construction described, the connector assembly can be readily inserted through the knockout hole of an electric box wherein the locking tangs will initially be flexed inwardly to pass through the knock-out hole of an electric box, and then spring outwardly to lock the connector assembly to the electric box or electric support panel with the trailing or grounding edge or tang of the retaining ring being inherently biased so as to be urged against the internal periphery of the knockout hole due to the frustro-conical configuration of the retaining ring to effect a positive electric ground as a result of the inherent resiliency of the respective grounding edge or tangs and the material from which they are formed.

This invention further contemplates providing the inlet end of the connector with a unidirectional cable or conductor retainer disposed within each of the inlet passageways in a predetermined oriented relationship therein.

IN THE DRAWINGS

FIG. 40 is an exploded perspective view of another embodiment of the invention.

FIG. 41 is a partial sectional side view of the embodiment of FIG. 40 having parts shown in section.

FIG. 42 is a side sectional view of the embodiment of FIG. 41 showing the connector assembly attached to a knockout hole of an electric box or panel.

FIG. 43 is a fragmentary side view similar to FIG. 42 rotated 90° to illustrate the locking position of the locking tangs relative to an electric box or panel.

FIG. 44 is a detail perspective view illustrating the assembly of hinging the clamping strap to the support saddle.

FIG. 46 is an exploded perspective view of a modified duplex connector embodying the invention.

FIG. 47 is the front or outlet end view of the duplex connector body of FIG. 46.

FIG. 48 is the rear or inlet end view of the duplex connector body of FIG. 46.

DETAILED DESCRIPTION

Figure 1:
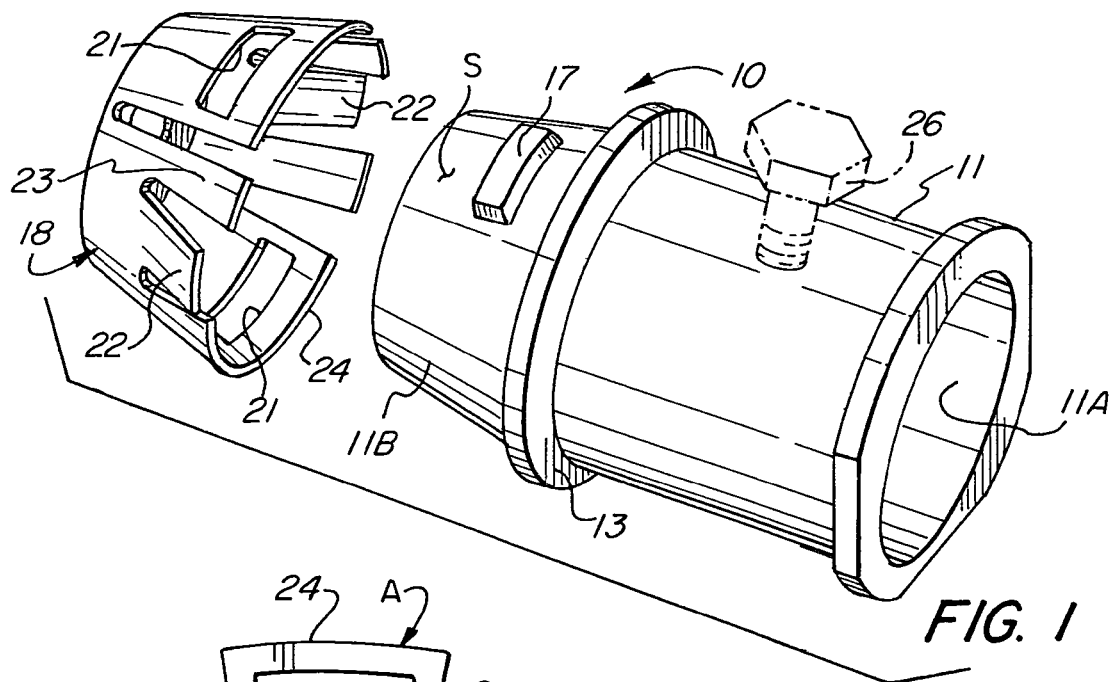
FIG. 1 is an exploded perspective view of the electrical connector assembly.

Referring to the drawings, there is shown in FIG. 1 an electrical connector assembly 10. The connector assembly 10 includes a connector body 11, which is usually formed as a metal casting, e.g. zinc or other suitable metallic alloy. The connector body 11 is formed with an inlet end portion 11A and an outlet end portion 11B and having a bore 12 extending therethrough. Intermediate the connector body 11 or between the inlet end portion 11A and outlet end portion 11B there is provided a radially outwardly extending flange 13 which functions as a stop to limit the amount that the connector body 11 may be inserted through the knockout hole 14 of an electric box or panel 15, as noted in FIG. 8.

Figure 8:
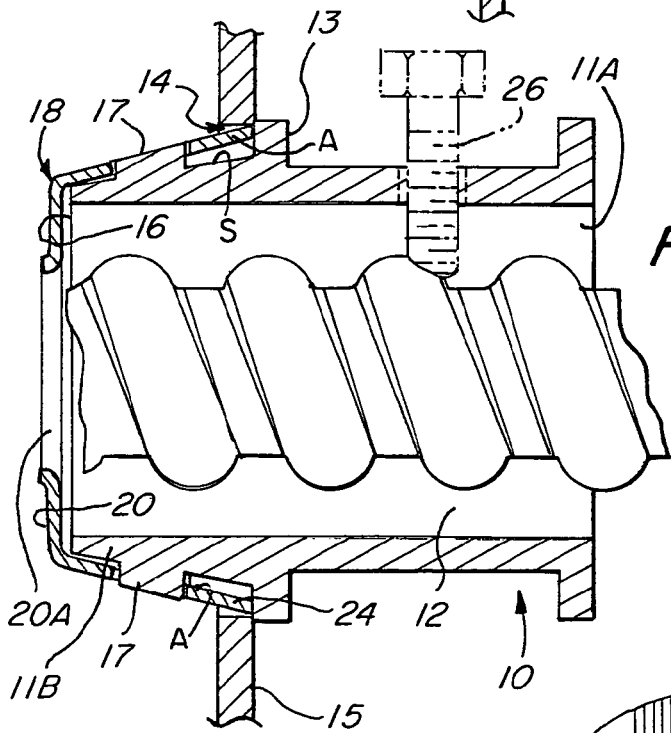
FIG. 8 is a section side view illustrating the connector assembly secured to an electric box, taken along line 8-8 on FIG. 10.
Figure 10:
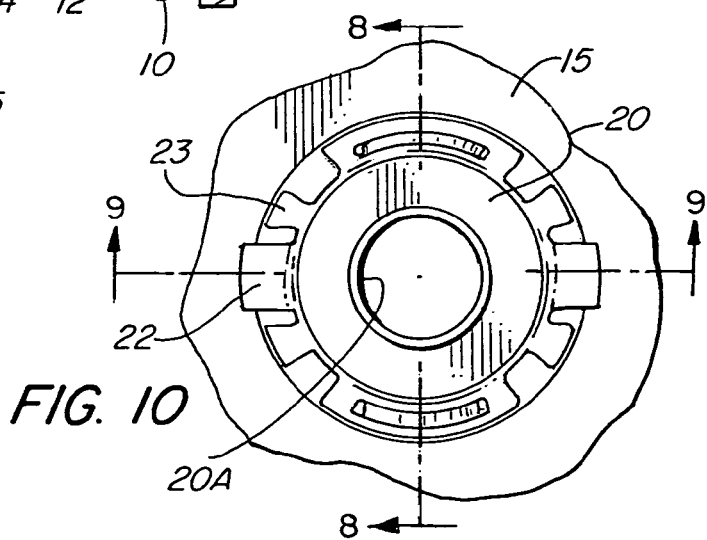
FIG. 10 is a fragmentary front view of the connector assembly secured to an electric box as viewed from the electrical box.

As shown in FIGS. 1 and 8, the outer surface S of the outlet end portion 11B slopes, tapers or converges toward the outlet opening 16 whereby the outer surface S of the outlet end portion 11B has a generally frustro-conical configuration. Formed on the surface S of the outlet end portion 11B is an outwardly projecting retainer lug 17. In the illustrated embodiment, two such lugs 17 are shown disposed 180° apart about the outer circumference of the outlet end portion 11B.

Figure 2:
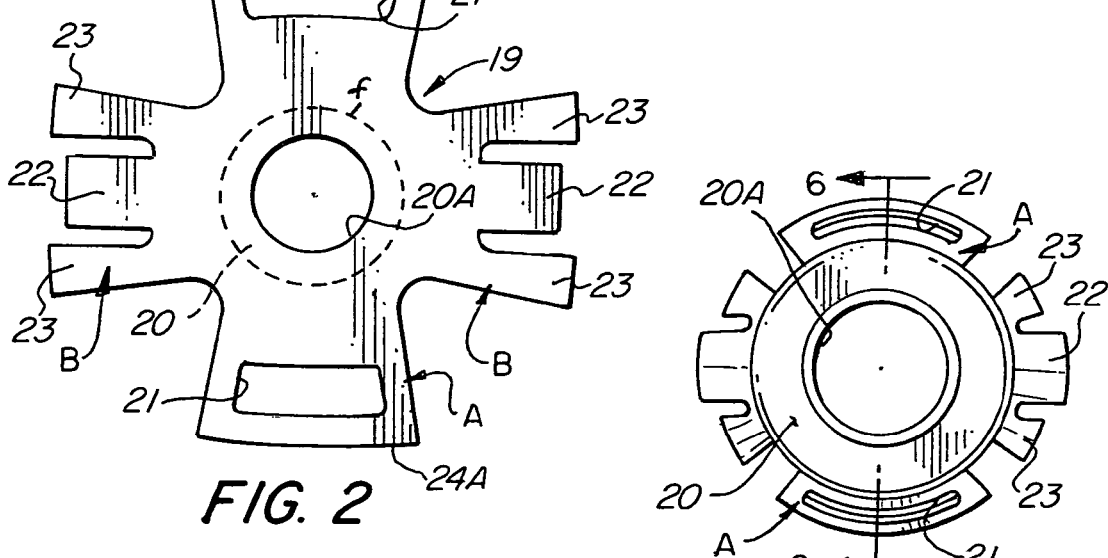
FIG. 2 is a plan view of the blank from which the outer retaining ring of the present invention is formed.
Figure 3:
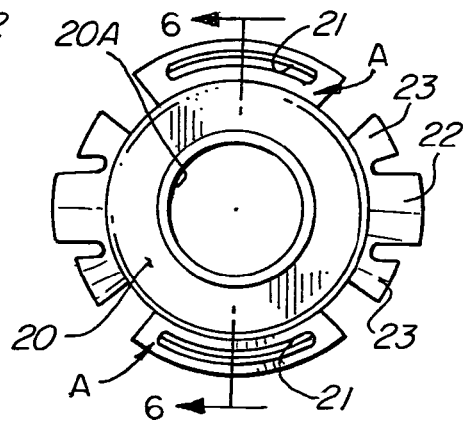
FIG. 3 is a detail front view of the outer retainer ring.
Figure 5:
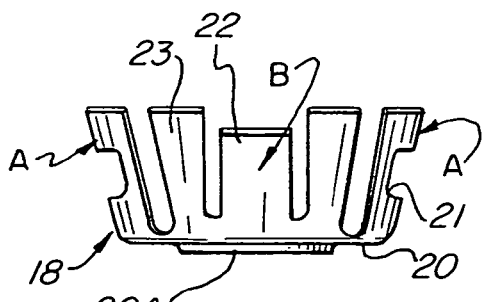
FIG. 5 is a detail view of FIG. 4 rotated 90°.
Figure 4:
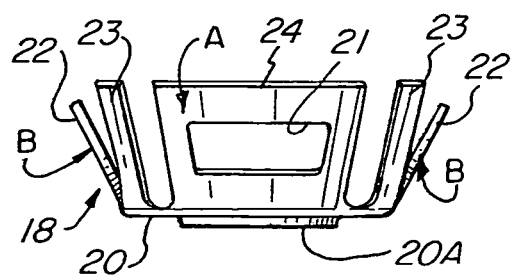
FIG. 4 is a detail top plan view of the outer retainer ring of FIG. 3.
Figure 6:
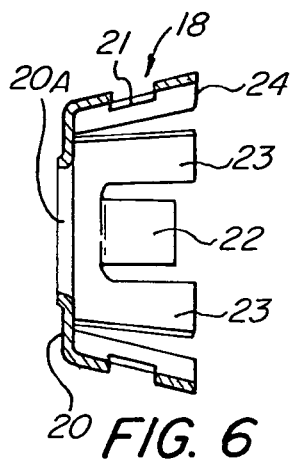
FIG. 6 is a sectional view of the outer retainer ring taken along line 6-6 on FIG. 3.

The connector assembly 10 also includes a snap fit retaining ring 18. In accordance with this invention, the retaining ring 18 is integrally formed from a blank 19 of spring steel material. As best seen in FIG. 2, the blank 19 is initially formed or stamped to define a generally cruciform shape. The cruciform shape is provided with a face portion 20 having a central opening or hole 20A and having four generally radially extending arms defining two pairs of oppositely disposed arms AA and BB.

Figure 9:
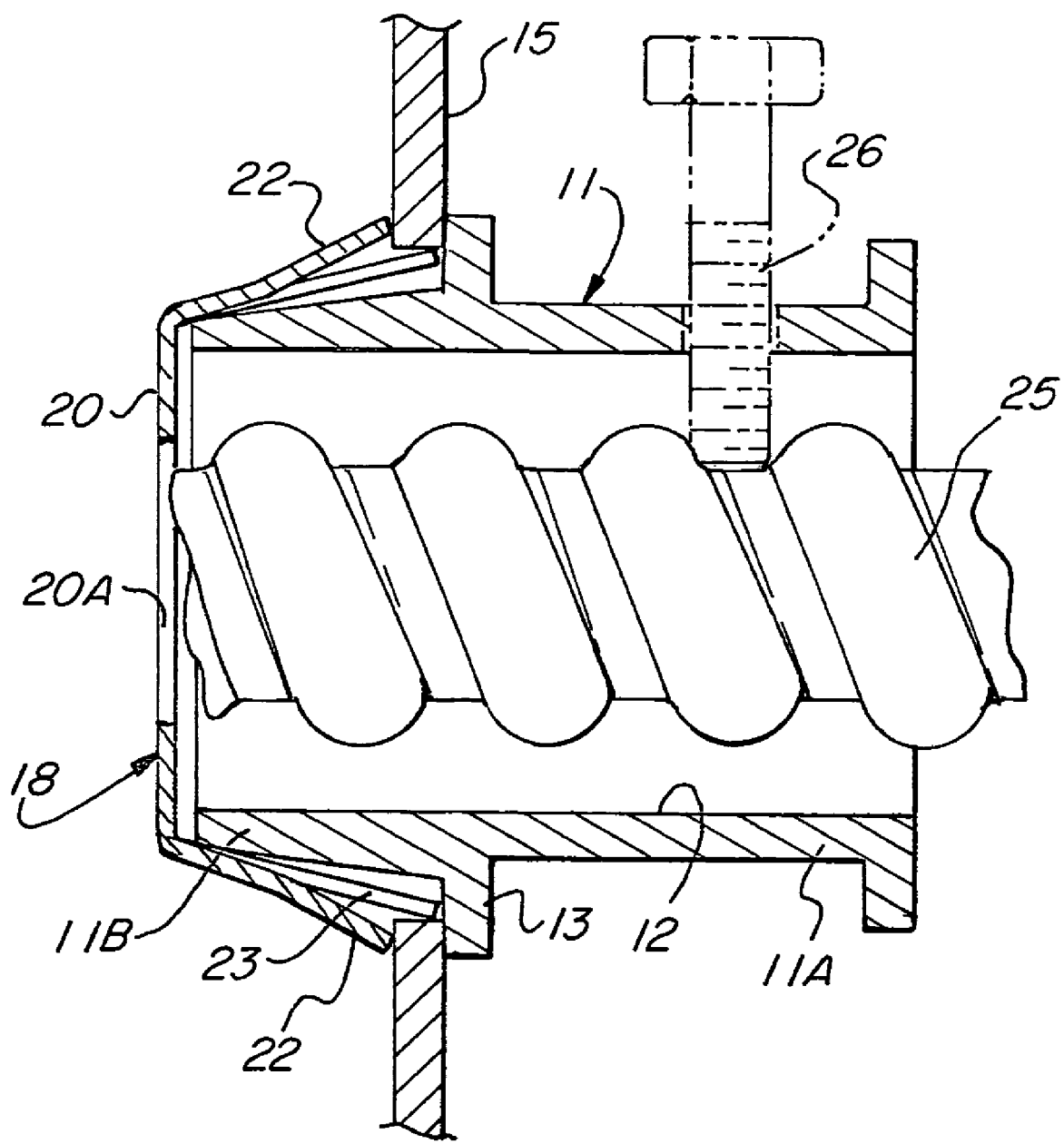
FIG. 9 is a sectional view taken along line 9-9 on FIG. 10 and rotated 90°.

As illustrated in FIG. 2, the opposed pair of arms AA are each provided with a retaining slot 21. The opposed pair of arms BB, as best seen in FIGS. 2 and 9, are blanked or formed to define a locking tang 22 and to either side thereof the trailing edge of the retaining ring defines an electrical grounding tang 23, 23. As shown, the locking tang 22 is slightly shorter than the adjacent grounding tangs 23, 23. The arrangement is such that the free end of the locking tangs 22 are sprung outwardly and formed so as to engage the inside surface of the electric box 15 in the assembled portion, as best seen in FIG. 9, to secure the connector assembly 10 to the electric box 15 and prohibit any unintentional withdrawal of the connector assembly 10 from the electrical box 15, whereas the free ends or trailing edges of the frustro-conical ring define the grounding tangs 23 that are biased in engagement with the internal periphery of the knockout hole 14. Also, the free edge or end 24A of arms A,A in the assembled position will also function as electrical grounding tangs, as noted in FIG. 8.

In forming the retaining ring 18 from blank 19, the respective arms A,A and B,B are subjected to a series of progressive bending dies which will gradually bend the respective arms about a foldline f, which defines the face or front portion 20, whereby arms A,A and B,B form a cup having circumscribing frustro-conical or outwardly flaring sides to define a frustro conical ring 18 which complements the conical surface S of the leading or outlet end portion 11B, as seen in FIG. 1. In doing so, the locking tangs 22 are cantileverly and outwardly bent or displaced relative to the surface of the frustro-conical ring at a slightly greater outwardly angle or slope than the adjacent grounding edge or tangs 23 and the slope of arms A,A. With the retaining ring 18 so formed, it can be readily fitted onto the outlet end portion 11B whereby the inherent resiliency of the arms A,A will cause the retainer slots 22 to snap fit onto the retaining lug 17 when slots 21 are placed in alignment with lugs 17. The arrangement is such that the retainer ring 18 will be firmly and positively secured to the outlet end portion 11B as seen in FIG. 8. Yet, due to the inherent resiliency of the material of the retaining ring 18, it can be easily detached from the outlet end portion 11B when removal is desired, without destroying the ring 18 by lifting arms A,A free of the retaining lugs 17.

It will be understood that, if desired, the opening 20A may be enlarged to the diameter of the foldline f, in which case the arms A,A and B,B may be gradually bent about the periphery of the enlarged opening, thereby eliminating the face portion 20.

Figure 7:
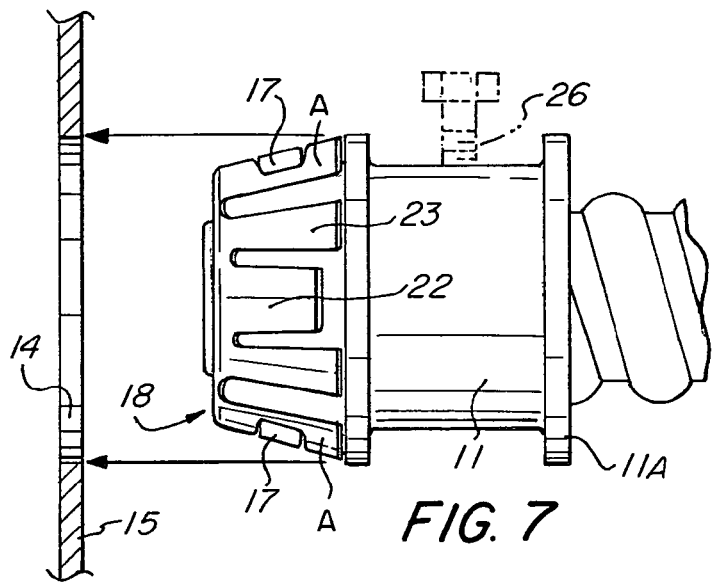
FIG. 7 is a side view of the connector assembly illustrating the alignment thereof relative to the knockout opening of an electric box.

With the retainer ring 18 properly secured to the outlet end 11B of the connector body 11, the connector assembly 10 can be readily secured to an electric box 10 by simply aligning the assembly 10 with a knockout hole 14, as best seen in FIG. 7, and inserting the leading or outlet end portion into the knockout hole 14 until the flange 13 engages the outer side of the electric box 15. In doing so, the tangs 22, 23 and the free ends 24 of arms A,A, respectively, will depress inwardly to permit insertion of the assembly 10. When the assembly is fully seated in the knockout hole 14, the locking tangs 22 will normally spring outwardly to secure the assembly 10 to the electric box 15, as noted in FIG. 9. The inherent resiliency of the grounding tangs 23, 23 and the free end or edge 24A of arms A,A are normally biased in engagement with the internal periphery of the knockout hole 14 to ensure a positive electrical ground with the electric box 15. The engagement of the free end 24A of arms A,A and grounding tangs 23, 23 against the inner periphery of the knockout hole 14, as noted in FIG. 8, further ensures the firm securing of the retaining slot 21 with the retaining lugs 17, so as to prohibit any disengagement of the outer retaining ring 18 from the connector body 11.

It will be understood that the wire conductor 25 may be secured to the connector assembly 10 either before or after the assembly 10 has been secured to the electric box 15. In the illustrated embodiment, the conductor wire 25 is simply inserted into the inlet end portion 11A and secured in position by a suitable securing means. In the illustrated embodiment of FIG. 1, the securing means is illustrated as a set screw 26. However, it will be understood that other forms of securing means, including some of the securing wire conductor retaining means disclosed herein, may be used in lieu of a screw.

From the foregoing, it will be apparent that the disclosed connector assembly is quite novel and simple in construction. The snap fit retaining ring 18 can be simply formed from a cruciform shaped blank 19 of spring metal whereby the opposed radially extending arms A,A and B,B can be readily formed into a cup having a generally frustro-conically shaped sidewalls complementing the slope of the outlet end portion 11A, and whereby the outer retainer ring 18 can be readily secured to the connector body simply by the inter-engagement of slots 21 with its complementary lugs 17.

In the assembled position, the outer retainer ring 18 is positively secured to the connector body in a manner to prohibit any unintentional separation. Also the tangs 22 and 23, which are formed integral with ring 18, are shaped and formed so that the locking tangs 22 secure the assembly 10 to an electric box 15 while the grounding tangs 23 ensure a positive electrical ground of the assembly 10 with the associated electric box 15.

FIGS. 11 to 19 illustrate various views of a modified form of the invention which are described in application Ser. No. 11/100,250 filed Apr. 6, 2005, now U.S. Pat. No. 7,064,272, for Snap In Electrical Connector Assembly With Unidirectional Wire Conductor Ring, which is incorporated by reference herein.

Figure 11:
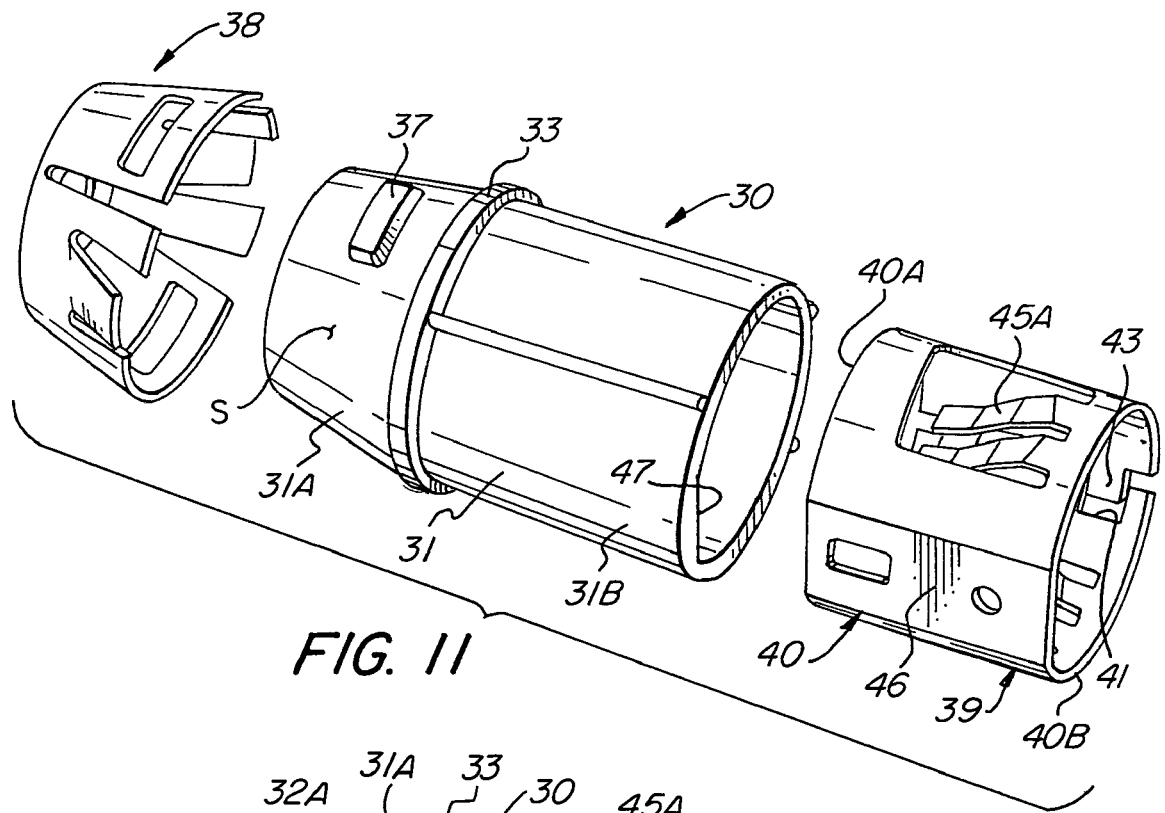
FIG. 11 is an exploded perspective view of a modified form of the invention.

In the embodiment illustrated in FIG. 11, the connector assembly 30 includes an internal wire retainer 39 in the form of a ring, cylinder or sleeve which is fitted to the bore 32B of the connector body 31, and which retainer 39 functions as a unidirectional retainer means arranged to permit a wire conductor to be readily inserted and secured thereinto, and which will resist any applied force imparted to the wire conductor in the opposite direction to prohibit any unintentional separation of the wire conductor from the connector body 31. Wire conductor, as used herein, means any wire, cable, helical wound metal covering or sheath (BX) wire, plastic sheath wire conductor and the like.

Figure 13:
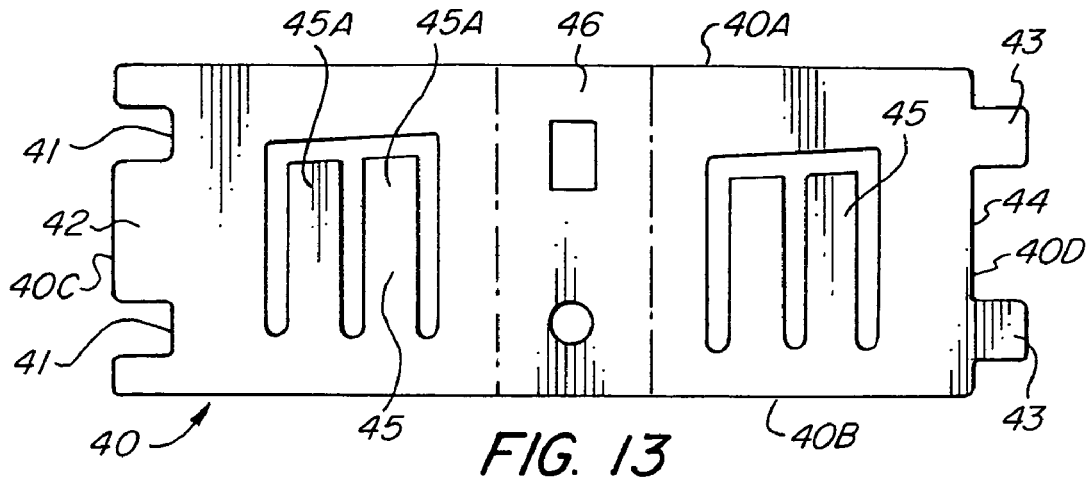
FIG. 13 is a top plan view of the blank from which the internal wire conductor retainer is formed.
Figure 14:
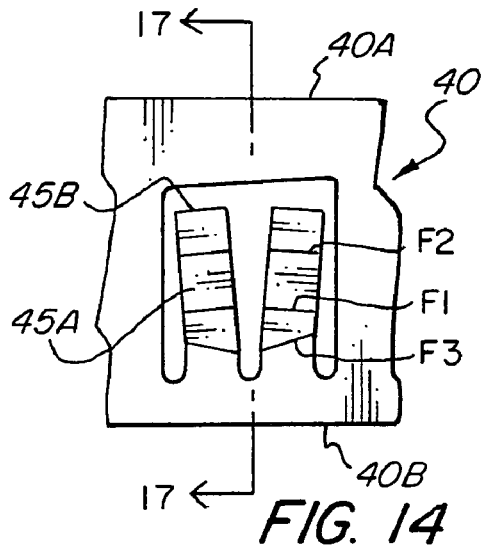
FIG. 14 is a fragmentary top view of a portion of the blank forming the inner retainer sleeve or ring.
Figure 15:
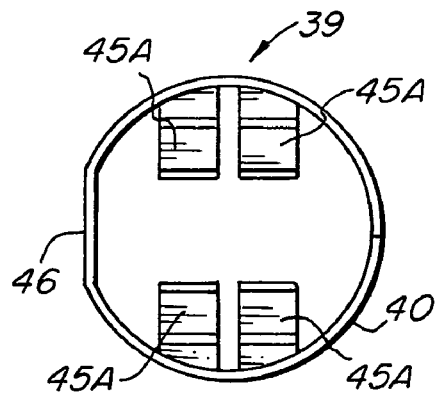
FIG. 15 is an end view of the inner wire conductor retainer ring or sleeve.
Figure 17:
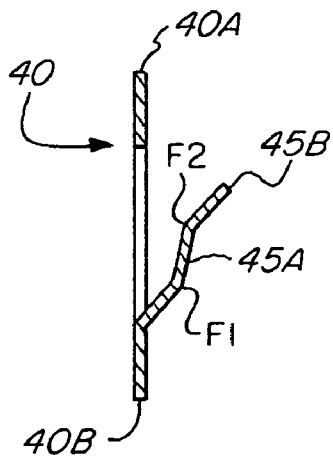
FIG. 17 is a section view taken along 17-17 on FIG. 16.

Referring to FIGS. 13 to 15, the internal retainer 39 is preferably formed from an elongated blank 40 of spring steel. The retainer blank 40, as best seen in FIG. 13, comprises an elongated generally rectangular blank having a longitudinal leading edge 40A, a trailing edge 40B and opposed end edges 40C and 40D. End edge 40C is provided with a pair of spaced apart notches 41, 41 and a projecting tongue 42. The other end edge 40D of blank 40 is provided with a pair of projecting tongues 43, 43 arranged to complement notches 41, 41 and a complementary notch 44 for receiving tongue 42 in the formed or rolled position of the retainer sleeve 39, as shown in FIG. 18.

Blanked, lanced, cut or stamped out of the plane of blank 40 are one or more tangs 45. In the form of the invention as shown in FIG. 13, tangs 45 are formed out of the plane of the blank. The respective tangs 45 are bifurcated to define a pair of finger tangs 45A, 45A longitudinally spaced along the longitudinal axis of the blank 40 at a distance, which, when the blank 40 is rolled to form the retainer sleeve 39, the respective pairs of finger tangs 45A are oppositely disposed, as best seen in FIG. 15.

Figure 18:
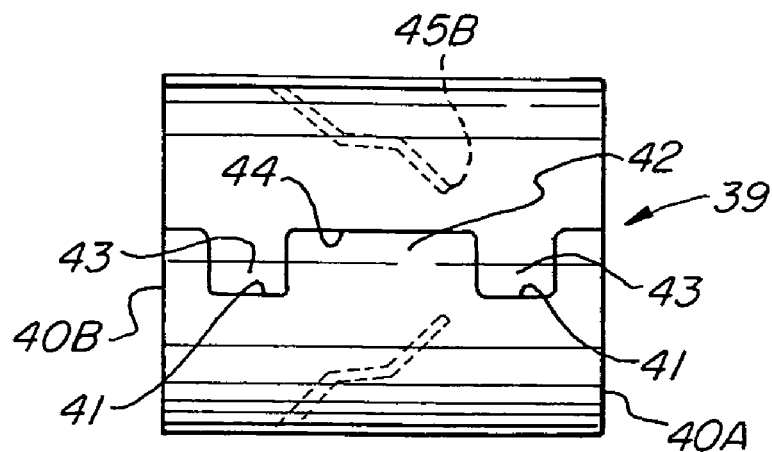
FIG. 18 is a side view of the inner retainer ring or sleeve.
Figure 19:
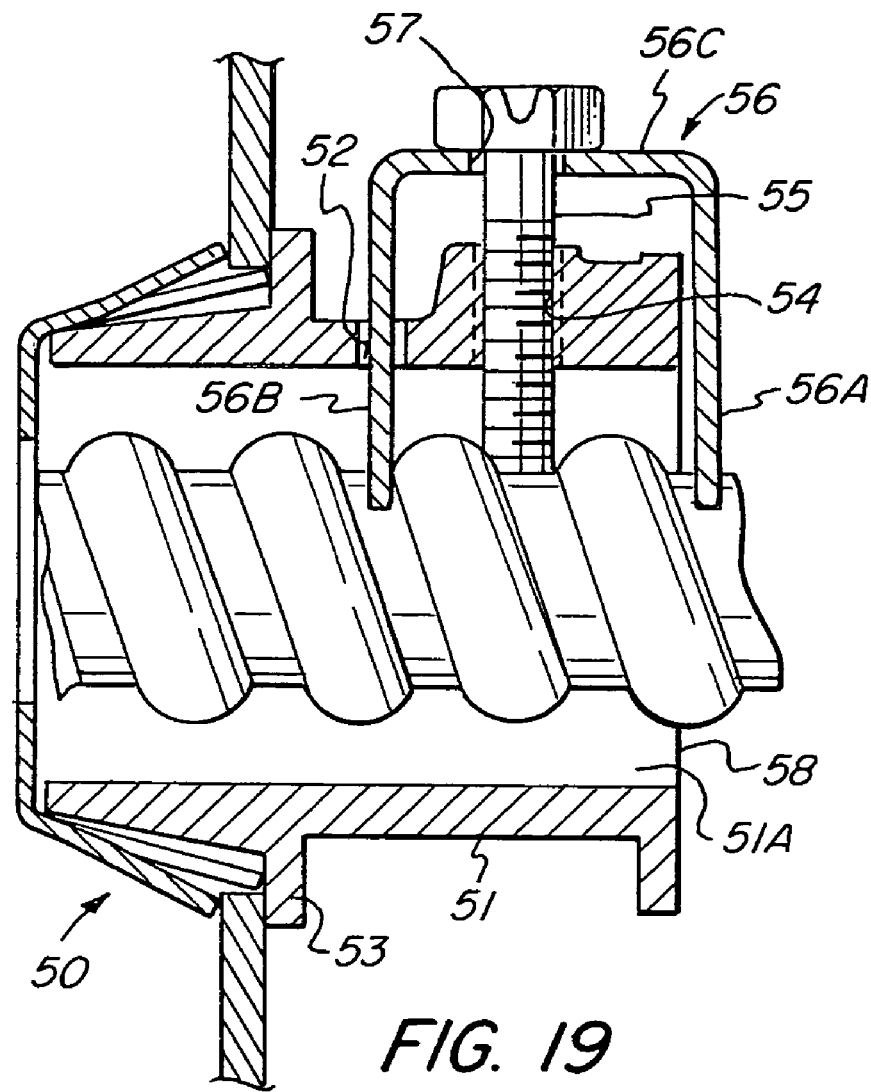
FIG. 19 is a sectional side view of still another embodiment.

As shown in FIGS. 15 and 18, the respective finger tangs 45A, 45A are inwardly bent from the plane of the retainer sleeve 39. In the illustrated embodiment, the respective finger tangs are provided with a pair of intermediate transverse fold lines $F_1$ and $F_2$ whereby the free end of the respective finger tangs is directed toward the longitudinal axis of the sleeve 39, as shown in FIG. 18.

Referring to FIG. 15, it will be noted that the cable retainer sleeve is or may be provided with a flattened portion 46 on one side thereof.

Figure 12:
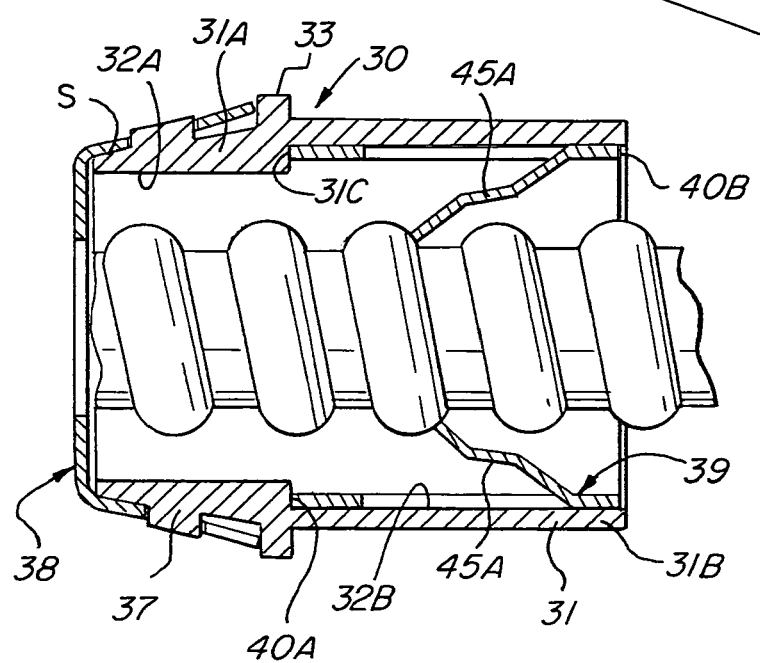
FIG. 12 is a sectional side view of the modified form of the invention of FIG. 11.

The connector body of FIGS. 11 and 12 may be formed with an internal complementary flat surface along a portion of the inner circumference thereof. The arrangement is such that the retainer sleeve 39, when inserted into the inlet end 31B of the connector body, is oriented so that the flattened surface 46 of the sleeve 39 complements the internal flattened surface 47 of the connector body. The orientation is such that the opposed finger tangs 45A are oppositely disposed to firmly grip a wire conductor therebetween, e.g. an armored conductor or other covered conductor, as shown in FIG. 12.

The outer circumference of the inner retainer sleeve or ring 39 is proportioned so that it can be press fitted or frictionally fitted into the inlet end 31B of the connector body 31 by a force sufficient to firmly secure the inner retainer ring or sleeve 39 within the inlet end so as to prohibit any separation of the retainer ring or sleeve 39 from the inlet end of the connector body. The complementary flattened surfaces 46 of the internal sleeve 39 and 47 of the inlet end of the connector body insures proper orientation of the internal sleeve 39 within the inlet end of the connector body.

Figure 16:
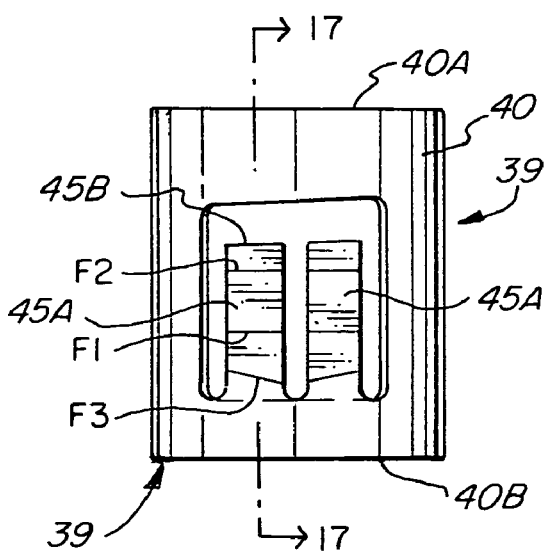
FIG. 16 is a top view of the inner retainer ring or sleeve of FIG. 15.

FIG. 14 illustrates a fragmentary portion of the blank 40 to show an intermediate step in forming the tang fingers 45A, 45A so that when the formed blank 40 is rolled to form the internal retaining sleeve, the tang fingers will be disposed in parallel as seen in FIGS. 15 and 16. This is attained by fold line $F_3$ which is disposed at an angle, as noted in FIG. 14, so that when the blank is rolled to form the internal retaining sleeve 39, the tang fingers 45A, 45A will be disposed in parallel. The free ends 45B of the respective fingers 45A are angularly offset to engage the grooves of an armored conductor, as noted in FIG. 12 or other covering sheath of a wire conductor that will resist a force attempting to effect separation of the conductor from the connector assembly. The respective free ends 45B may also be laterally offset so that an armored conductor may be threadedly connected to the internal sleeve 39, as well as by simply inserting the armored covered conductor into the retainer sleeve to effect a snap fit connection.

Figure 20:
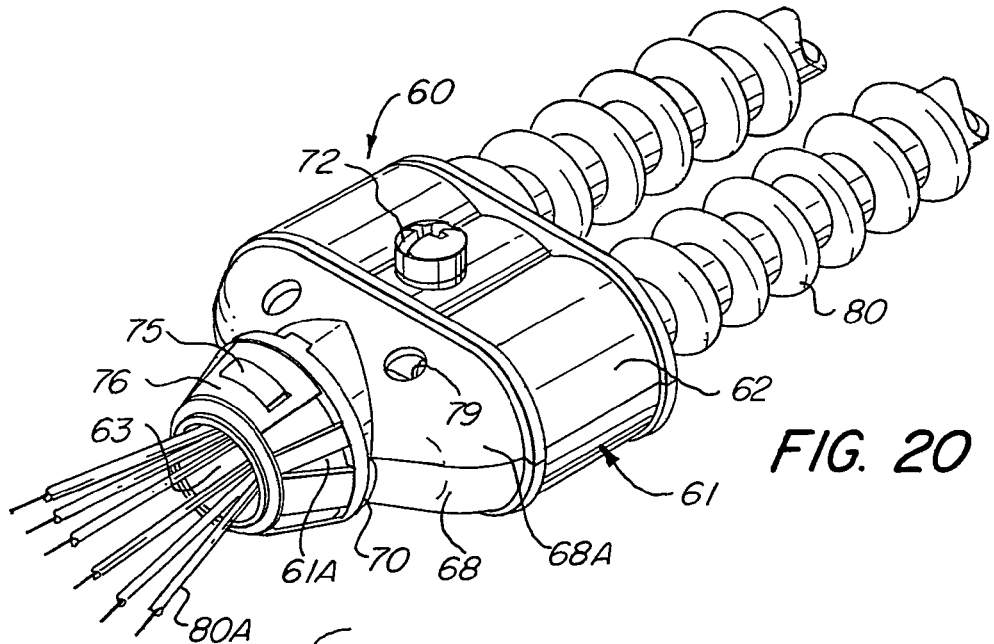
FIG. 20 is a perspective view of a further embodiment of the invention.
Figure 21:
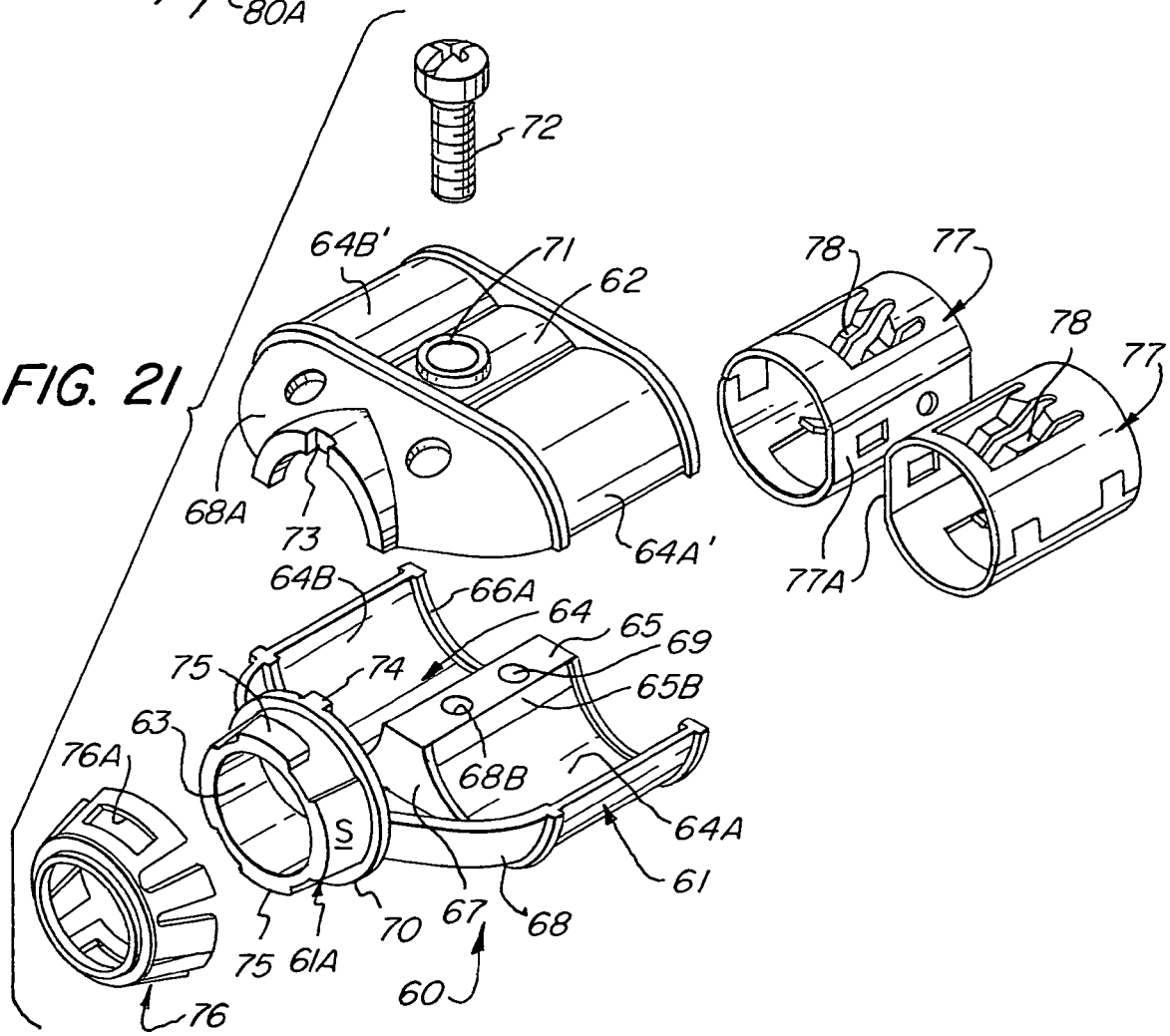
FIG. 21 is an exploded perspective view of the embodiment of FIG. 20.
Figure 22:
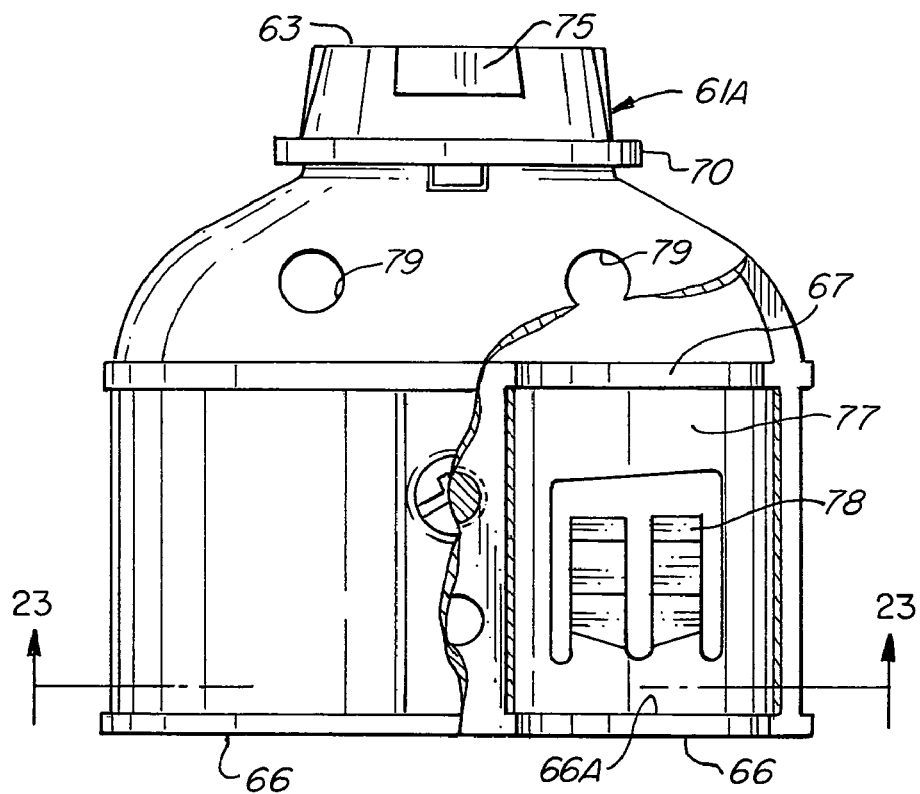
FIG. 22 is a top plan view of the embodiment of FIG. 20 having parts thereof broken away.
Figure 23:
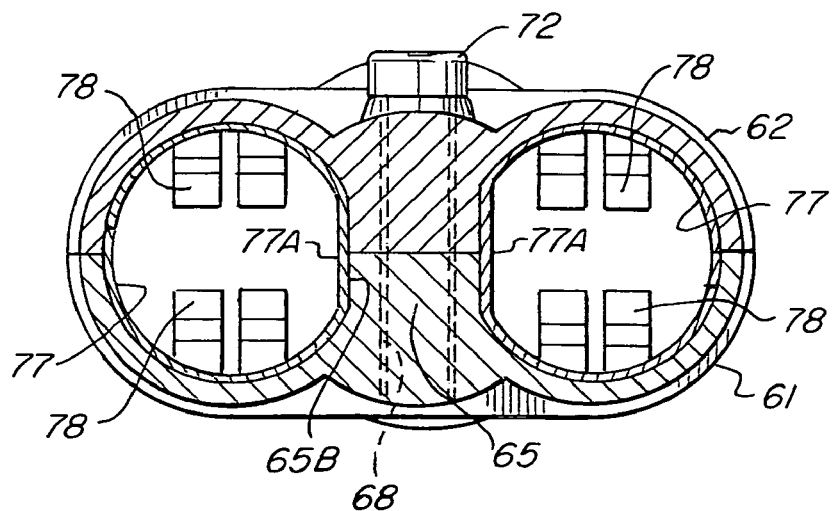
FIG. 23 is a sectional view taken along line 23-23 on FIG. 22.
Figure 24:
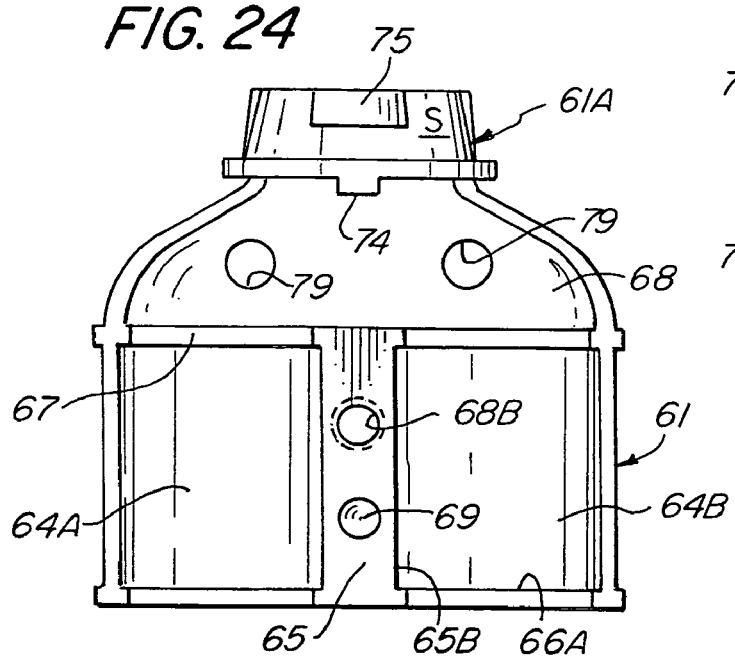
FIG. 24 is the interior plan view of one section of the connector housing of the embodiment illustrated in FIG. 20.
Figure 25:
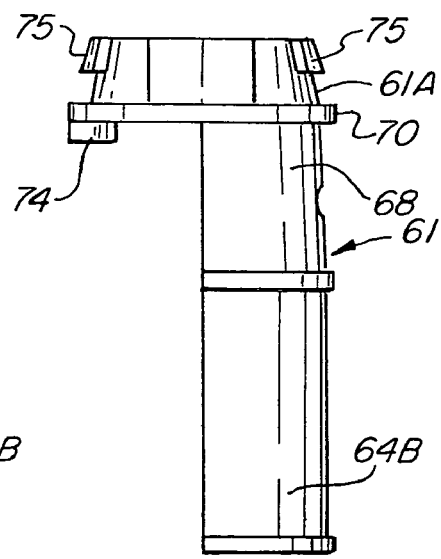
FIG. 25 is an outer end view of FIG. 24.
Figure 26:
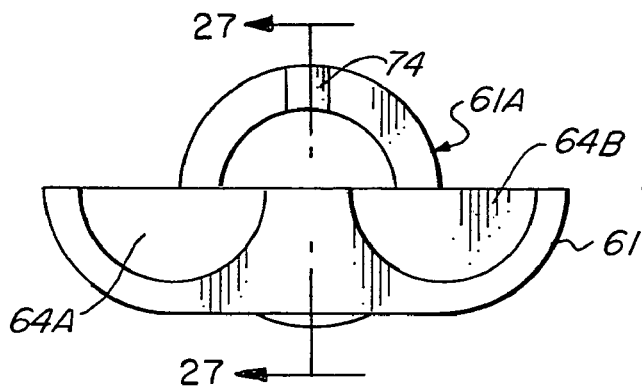
FIG. 26 is an end view of the connector housing section of FIG. 24.
Figure 27:
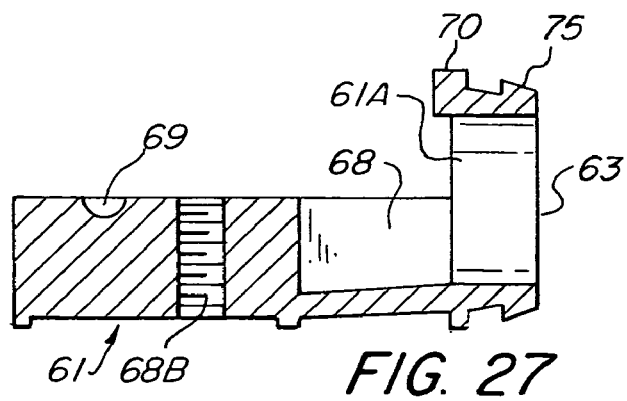
FIG. 27 is a sectional view of the housing section taken along line 27-27 on FIG. 26.
Figure 28:
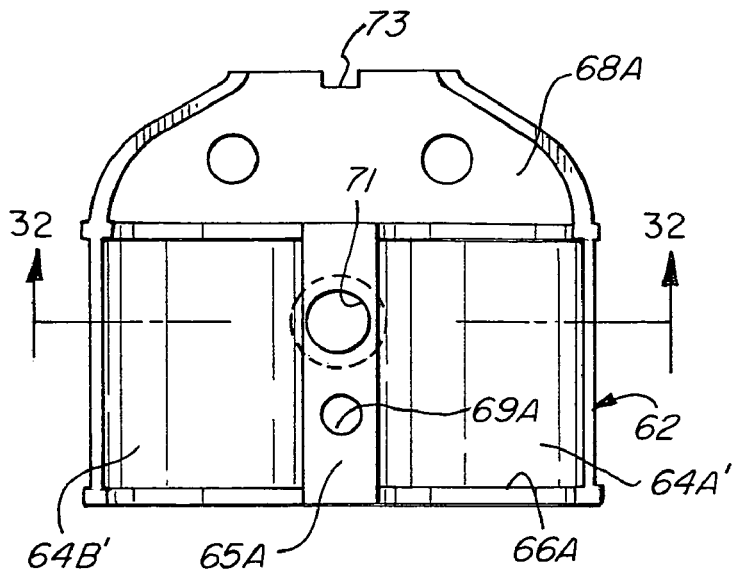
FIG. 28 is an inside plan view of the complementary housing section of the embodiment illustrated by FIG. 20.
Figure 29:
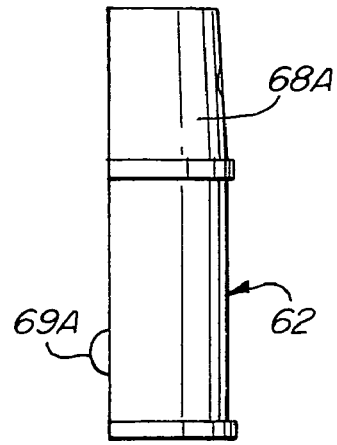
FIG. 29 is an end view of FIG. 28.
Figure 30:
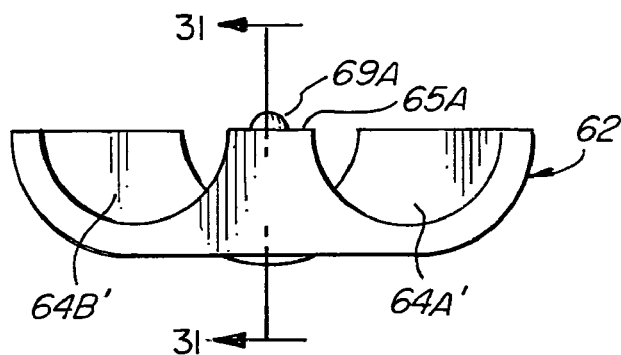
FIG. 30 is an inlet end view of FIG. 28.
Figure 31:
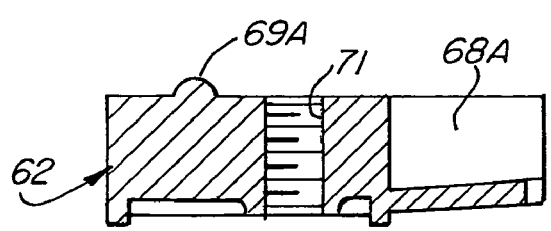
FIG. 31 is a sectional view taken on line 31-31 on FIG. 30.
Figure 32:
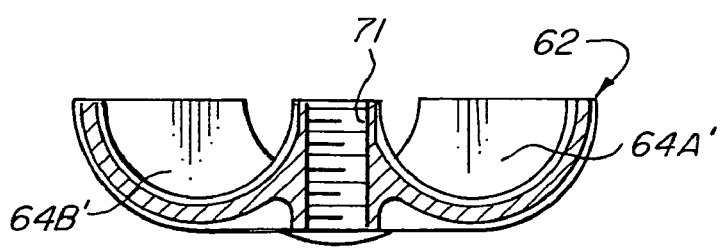
FIG. 32 is a sectional view taken on line 32-32 on FIG. 28.

FIGS. 20 to 32 are directed to a further modification of the disclosed invention. As best seen in FIGS. 20 and 21, the connector assembly 60 includes a housing or connector body 61 having an outlet end 61A and an inlet end 64 connected to the outlet end 61A by a transition section 68, 68A, preferably formed as casting of any suitable metal or alloy material, e.g. zinc, aluminum and the like. While the inlet end 64 of the connector body 61 is illustrated as a duplex inlet end, it will be understood that the inlet end may be formed to accommodate more than two separate wire conductors, cables or the like.

The outlet end 61A and the external frustro-conical ring 76 circumscribing the outlet end 61A are similar in structure hereinbefore described with respect to FIGS. 1 to 10. A more detailed description of the embodiments disclosed in FIGS.

20 to 32 is set forth in application Ser. No. 11/100,250 filed Apr. 6, 2005 for Snap In Electrical Connector Assembly With Unidirectional Wire Conductor Retaining Ring, now U.S. Pat. No. 7,064,272, which is incorporated herein by reference.

With the connector body of FIG. 20 illustrated, it will be noted that the connector assembly 60 can be readily secured to an electric box or panel simply by inserting the leading or outlet end 61A through a knockout hole of a panel or electrical box so as to be readily secured thereto with a snap fit as hereinbefore described. With the arrangement described, the respective wire conductors or cables 80 can be readily attached to the trailing or inlet end of the connector assembly 60 with a simple snap fit, as described in the said application Ser. No. 11/100,250 filed Apr. 6, 2005, now U.S. Pat. No. 7,064,272, which is incorporated by reference herein.

From the foregoing, it will be noted that the connector assemblies disclosed in FIGS. 1 to 32 utilize a frustro conically shaped outer retainer ring which is uniquely secured to the leading end of a connector body, with securing tangs and grounding tangs arranged to effect both a positive securement of the connector assembly to a knockout hole of an electric box or panel and a positive electrical ground. In association with an external frustro conical retaining ring, the disclosed embodiments include a trailing or inlet end constructed to receive an associated wire or conductor retainer in each inlet end for securing a wire conductor thereto by a snap fit in the inlet end of the connector body. It will be understood that the described electrical connector bodies may include one or more wire or conductor cable receiving chambers formed in the inlet end thereof, depending upon the number of wire conductors one may wish to connect to the inlet end of a connector body.

Figure 33:
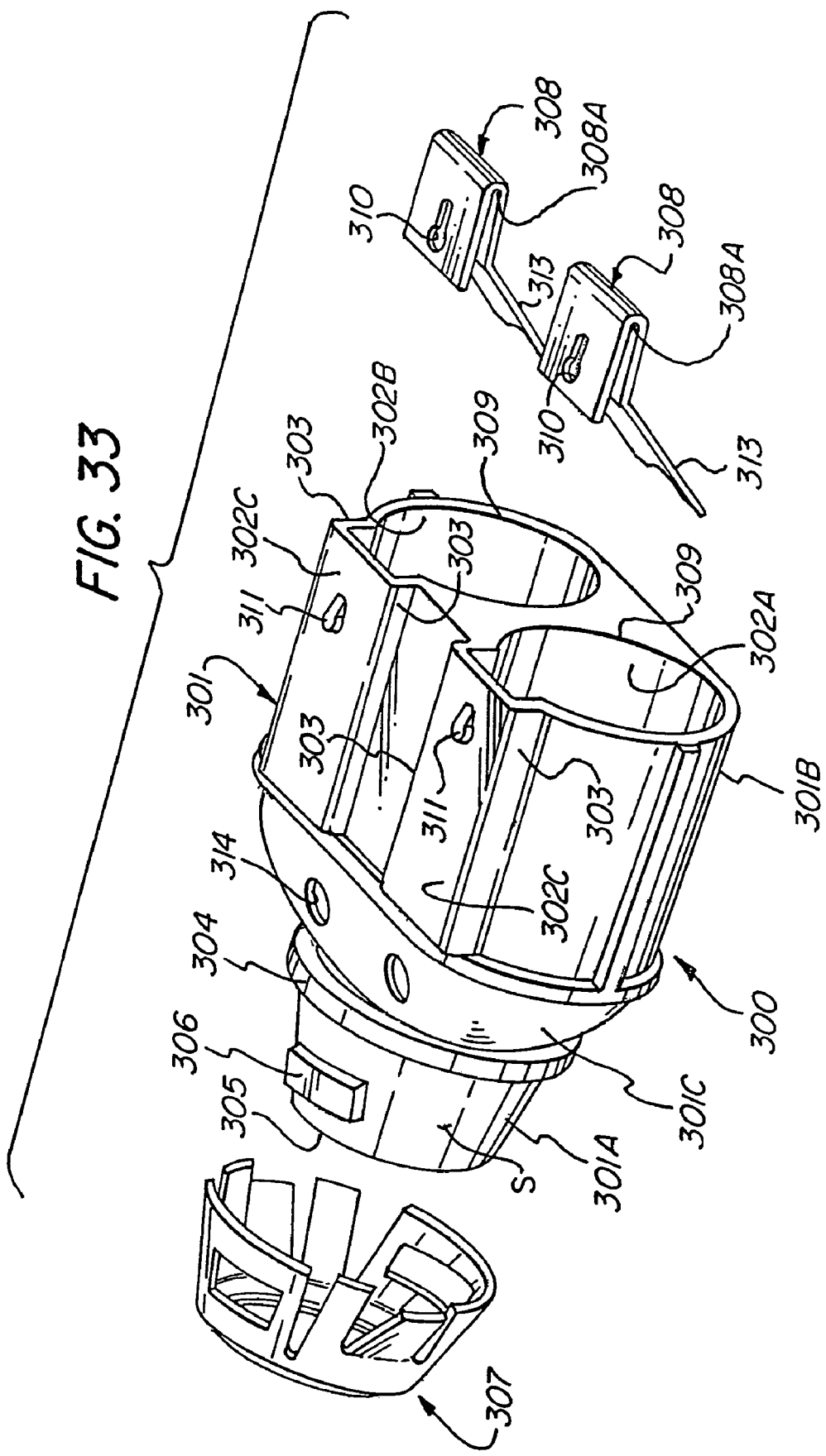
FIG. 33 is an exploded perspective view of still another modification of the invention.
Figure 34:
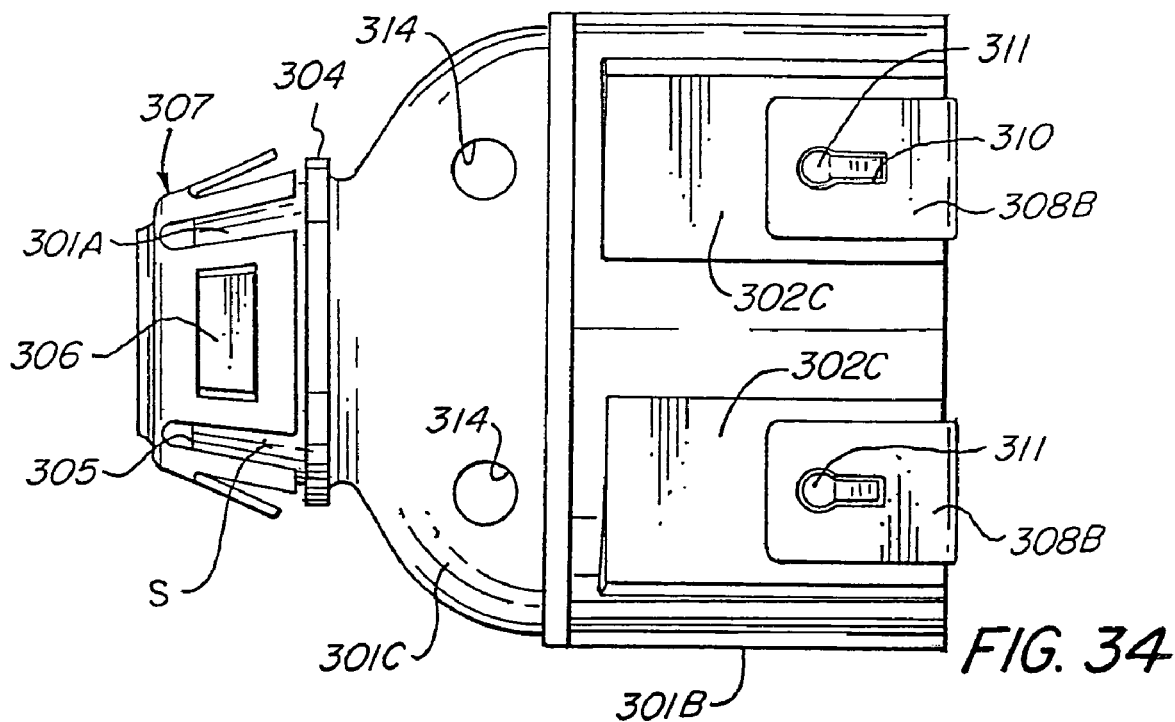
FIG. 34 is a top plan view of the embodiment of FIG. 33.
Figure 35:
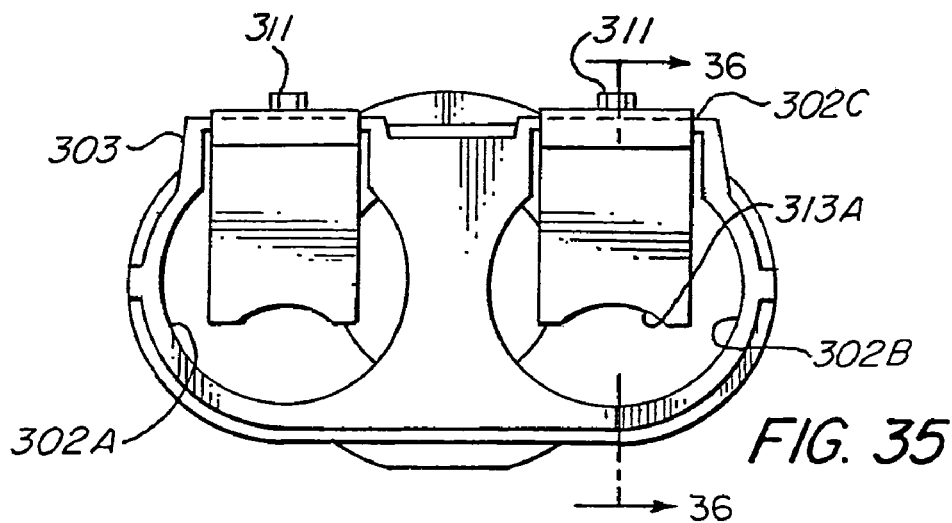
FIG. 35 is a right end view of FIG. 34.
Figure 36:
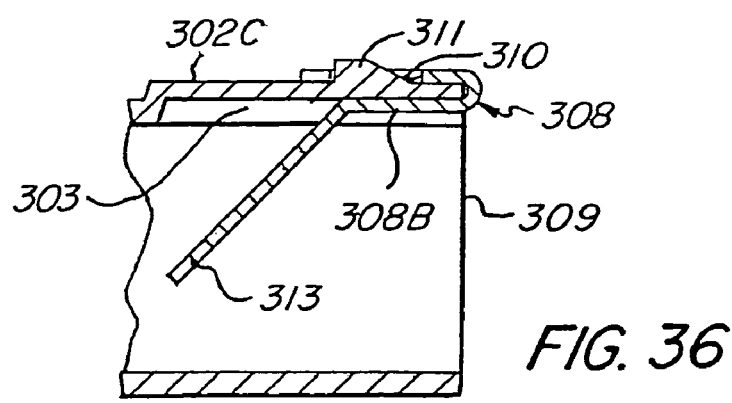
FIG. 36 is a sectional view taken along line 36-36 on FIG. 35.

FIGS. 33 to 36 illustrate a further embodiment of the invention. The connector assembly 300, as illustrated in FIGS. 33 and 36, includes a connector body 301 formed as a unitary casting of any suitable metal or alloy, e.g. zinc and the like. The embodiment of FIG. 33 differs from that of FIG. 20 in that connector body 301 is formed as a unitary casting rather than as separable parts as illustrated in FIG. 20. A more detailed description of the embodiment of the connector assembly of FIGS. 33 to 36 is set forth in application Ser. No. 11/403,099 filed Apr. 12, 2006, for Snap Fit Electrical Connector Assembly With Frustro-Conical Retainer Ring And Internal Unidirectional Snap Fit Wire Conductor Retainer, now U.S. Pat. No. 7,151,223, which is incorporated by reference herein.

Figure 37:
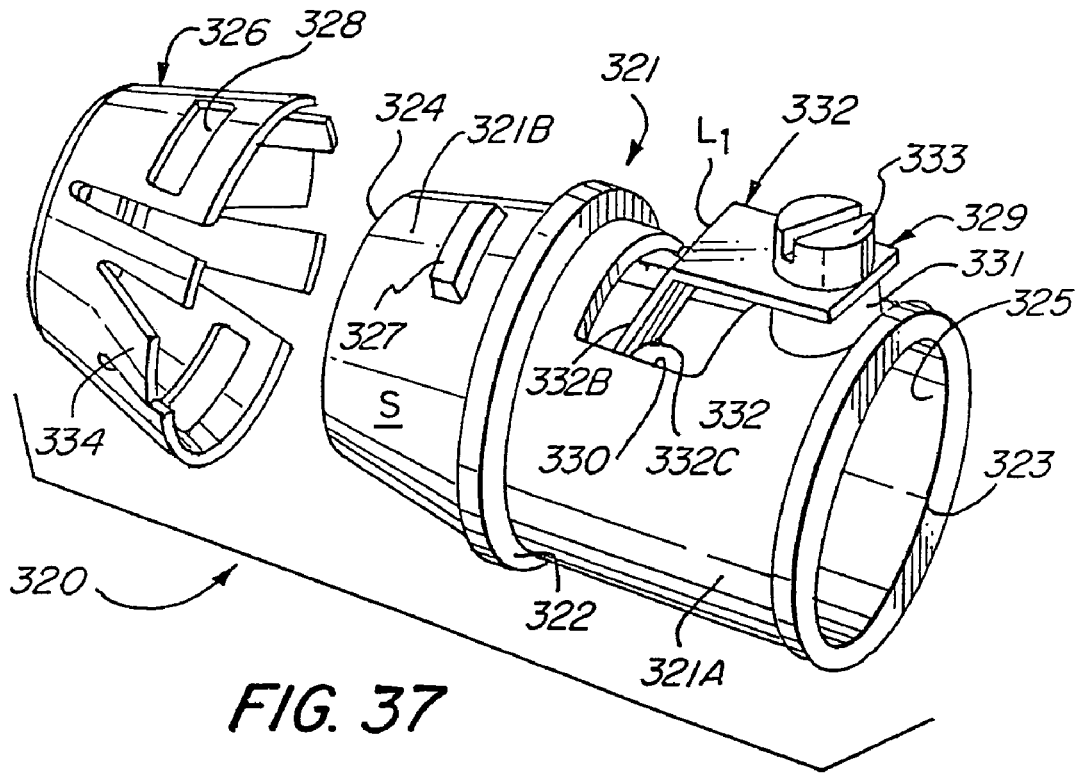
FIG. 37 is a perspective of a partially exploded view of another embodiment of the disclosed invention.
Figure 38:
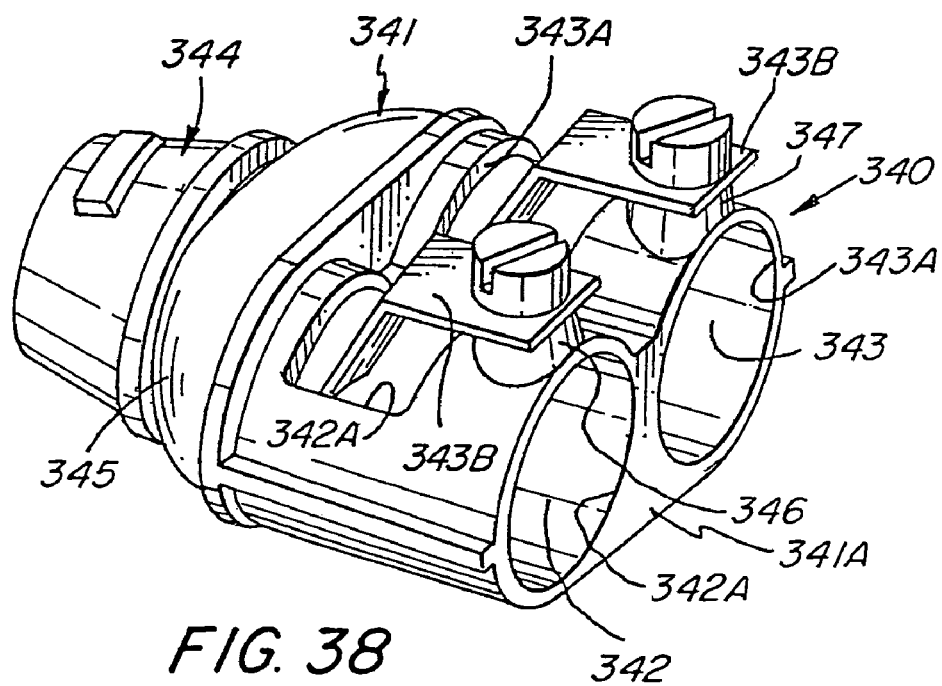
FIG. 38 is a perspective view of another modified form of the disclosed invention illustrated without the outer retainer ring.
Figure 39:
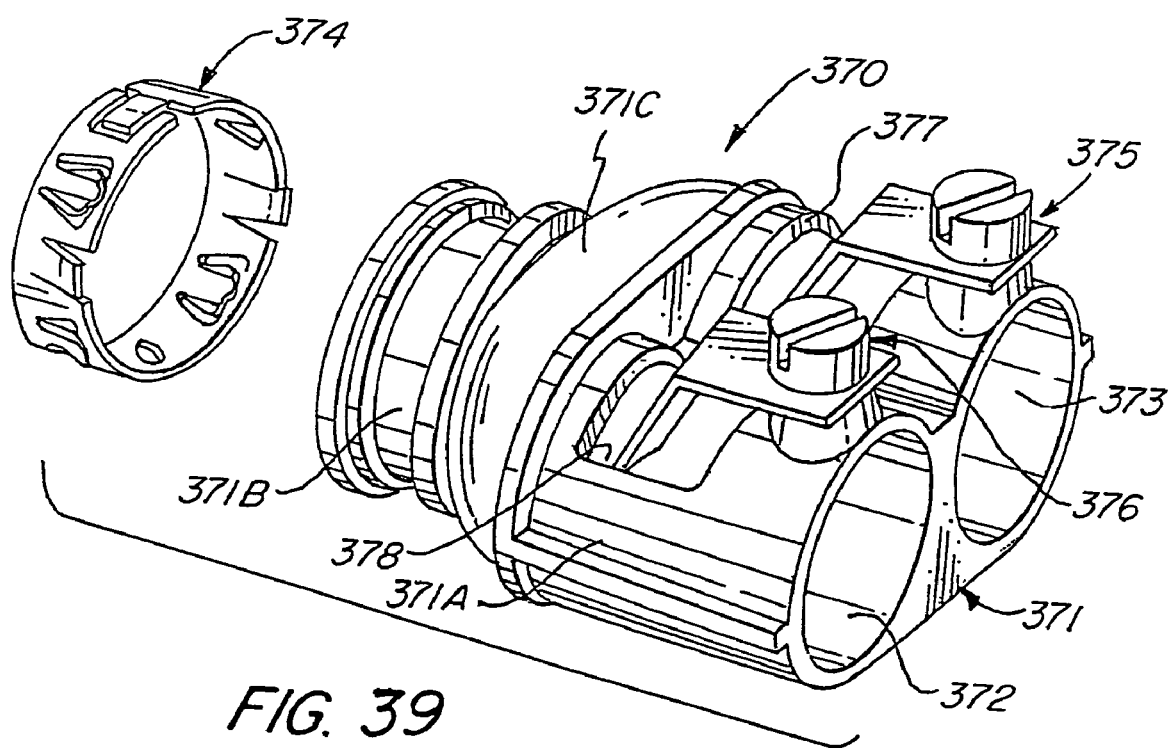
FIG. 39 is a perspective exploded view of a modified form of the invention.

FIGS. 37, 38 and 39 illustrate further modified embodiments of the invention which are disclosed in the co-pending application Ser. No. 11/501,131 filed Aug. 8, 2006 for Electrical Connector With Outer Retainer Ring And Unidirectional Conductor Retainer, which is also incorporated by reference herein, and need not be repeated herein.

FIGS. 40 to 49 are directed to other modified embodiments of the invention. FIGS. 40 to 49 are directed to a strap-type electrical connector 500 for securing either nonmetallic cables or armor or metal clad cables thereto, as will be described herein.

As best seen in FIGS. 40-49, the illustrated strap type connector 500 includes a connector body 501 having an outlet end 502 terminating in an outlet opening 503. Opposite the outlet opening 503, the connector body 501 is provided with an inlet opening 504. Circumscribing the connector body between the outlet opening 503 and the inlet opening 504 is a radially outwardly extending flange 505 which serves as a stop to limit the distance the outlet end portion of the connector body 501 may be inserted through a knockout hole or opening 506 of an electric box or panel 507. The outer surface "S" of the outlet end 502 slopes or converges inwardly toward the outlet opening 503.

Circumferentially spaced about the outlet end 502 of the connector body 501 are one or more radially outwardly projecting retaining lugs 508. In the illustrated embodiment, two such retaining lugs 508 are provided 180° apart.

Secured to the outlet end 502 of the connector body and circumscribing the outlet end 502 is a frustro-conical snap fit retainer or retainer ring 509, similar to the frustro-conical retainer ring hereinbefore described with respect to FIGS. 1 to 5 herein. As best seen in FIG. 40, the frustro-conical, snap-fit, retainer 509 includes a front opening 510 circumscribed by rearwardly and outwardly sloping locking tangs 511 and grounding tangs 512 and 513. Grounding tangs 513 are provided with retaining slots 514 arranged to receive the retaining lugs 508 when fitted onto the outlet end 502 of the connector body 501, as hereinbefore described.

Connected to the connector body 501 adjacent the inlet opening and forming an integral part of the connector body 501 is a cable support saddle 515 which extends about a circumferential portion of the inlet opening 504, e.g. between approximately 120° to 180° about the inlet opening 504. As shown, the cable support saddle 515 is a curvilinear extension of the inlet opening 504 terminating in laterally outwardly extending ears or lobes 515A and 515B. As best seen in FIG. 40, ear or lobe 515A has a hinge slot 516 formed therein and ear or lobe 515B is provided with an internally threaded hole 517.

Hingedly connected to ear or lobe 515A is a clamping strap 518. As best seen in FIG. 40, the clamping strap 518 is provided with a readily detachable hinge structure 519 which is angularly formed relative to the plane of the strap 518 so as to be received in the hinge slot 517 when connected to the saddle 515. According to this invention, the hinge structure 519 terminates laterally outwardly extending foot portion 520.

In accordance with this invention, the foot portion 520 of the hinge structure 519 is provided with a width "W" which is slightly greater than the width "w" of the hinge slot 516. The arrangement is such that the clamping strap 518 must be skewed or angled relative to the hinge slot 516 for inserting the foot portion 520 through the hinge slot 516 for connecting the clamping strap 518 to the ear or lobe 515A. When so connected, the clamping strap 518 is free to pivot relative to the saddle 515 between a cable clamping and unclamping position without causing the clamping strap 518 to become detached from the saddle 515. To effect detachment of the clamping strap 518 from the ear or lobe 515A, one must intentionally skew or angle the clamping strap 518 relative to the hinge slot 516 to effect the removal of the clamping strap 518 from the saddle.

The other end of the clamping strap 518 is provided with a strap hole 521 for receiving a fastener, e.g. a screw 522 for securing the clamping strap 518 to the ear or lobe 515B so that the cable is firmly clamped and secured between the saddle 515 and the clamping strap 518.

To insure a positive gripping of the cable between the saddle 515 and the clamping strap 518, an intermediate portion of the clamping strap is provided with a depression 523 that will "bite" or exert a positive frictional force on the cable, when secured in the clamping position (FIG. 41) so as to prohibit the cable of being pulled free or become accidentally detached from the connector body.

As shown, the connector body 501 and connected saddle 515 is preferably formed as a metal casting, e.g. zinc or other suitable metallic alloy. The strap electric connector as illustrated in FIGS. 40 to 44 is preferably used for securing either a non-metallic cable or romex type conductor to an electric box or panel.

By slightly modifying the shape of the clamping strap, the described strap type electric connector may be readily adapted for connecting an armored, or metal clad cable, to an electric box or panel.

Figure 45:
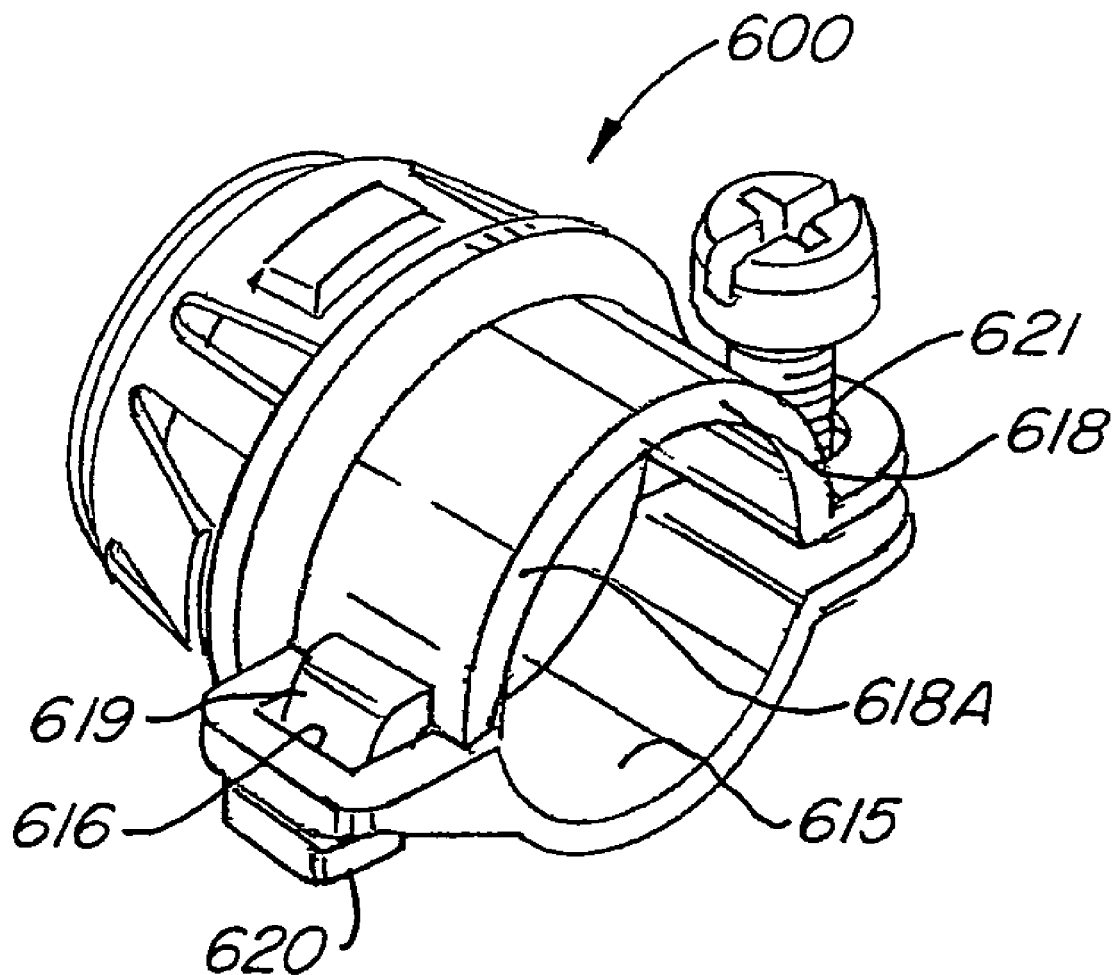
FIG. 45 is a perspective view of a modified strap type electrical connector.
Figure 49:
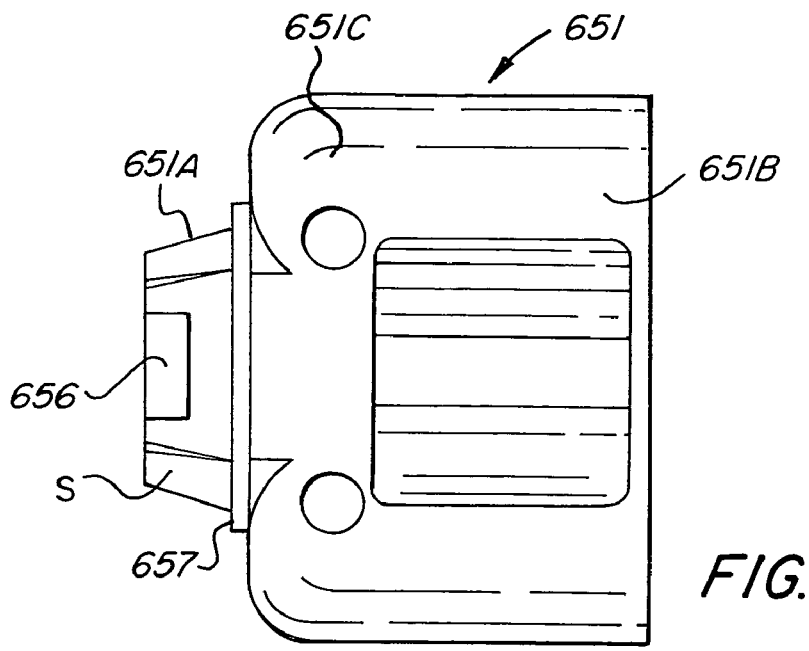
FIG. 49 is a top plan view of a duplex connector body of FIG. 46.

FIG. 45 illustrates a modified strap type electrical connector assembly 600 for use in securing an armor or metal clad cable. As shown in FIG. 45, the strap type electrical connector assembly 600 is provided with clamping strap 618 having an intermediate curvilinear portion 618A shaped to compliment the roundness of a metal clad cable, e.g. a BX cable. One end of the armored cable strap is provided with a hinge structure 619, 620 similar to the hinge structure 519, 520 hereinbefore described, whereby the armored cable strap can be hingedly connected to the hinge slot 616 of the associated saddle 615. The other end of the armored cable strap 618 is provided with a hole or opening 621 for receiving a fastening screw similar to that described with respect to FIG. 41. In all other respects, the function and structure of the strap connector 600 is similar to that described with respect to FIGS. 40 to 44, and need not be repeated.

From the foregoing description, it will be noted that the armored cable strap 618 can be readily interchanged for the non-metallic cable strap 518 depending upon the type of cable to be secured by the described connector body.

It will be apparent that the principle components described herein, viz. the external frustro-conical retainer rings, the connector bodies and the differently described wire conductor retainers, are rendered readily interchangeable with respect to any of the complementary corresponding components of the various embodiments described herein.

It is to be further noted that the frustro-conical retainer ring, as described herein with respect to the various embodiments disclosed, achieves the further advantage of ensuring positive electrical grounding of the described connector assemblies to an electrical box or panel despite the varying allowable diameter tolerances a knockout hole may have, as permitted by the allowable codes or electrical standards, due to the inherent resiliency and shape that a frustro-conical configuration allows, as described herein.

Referring to FIGS. 46 to 51, there is disclosed a further improvement of the invention describe herein. FIG. 46 illustrates an exploded view of a duplex type connector assembly 650 that includes a connector body 651 having a single outlet end portion 651A and a duplex inlet end portion 651B. As shown, the inlet end portion 651B includes a pair of parallel passageways or bores 652, 653 that are in communication with the outlet end portion 651A. Between the inlet end portion 651 and the outlet end portion 651A is a transition section 651C, which diverges toward the outlet end opening 354. The respective passageways or bore are separated by a partition wall 655 having opposed vertical surfaces 655A, 655B, as viewed in FIGS. 46-48.

As hereinbefore described, the outlet end portion 651A which defines an outlet opening 654 is provided with a tapered outer surface S which converges toward the outlet opening 654. Circumferentially spaced about the outlet opening and extending radially outward relative to the surface S of the outlet end portion 651A are opposed retaining lugs 656. A radially outwardly extending stop flange 657 circumscribes the outlet end portion 651A adjacent to the transition section 651C, which functions as a stop to limit the amount the connector body may be inserted into a knockout hole of an electric box or panel, as herein previously described. In this form of the invention, the connector body 651 is constructed so that it can be readily formed as a unitary casting from a suitable moldable metal alloy, e.g. zinc, aluminum and the like. Such integrally constructed connector body obviates the prior practice of constructing a connector body of multiple parts which required assembly.

Circumscribing the outer surface S of the outlet end portion 651A is a frustro-conical outer retainer 658 similar to that described with respect to FIGS. 1 to 10, and which need not be repeated.

Disposed within each of the respective passageways or bore 662, 663 is a wire or cable unidirectional retainer means. In the illustrated embodiment, the unidirectional retainer means is in the form of a sleeve or cylinder 659, 660 formed preferably from a blank of spring steel as hereinbefore described with respect to FIGS. 13 to 18. As described, the respective wire or cable retainers 659, 660 have a generally circular configuration except for a flattened or linear wall surface 659A, 660A, which is arranged to engage the adjacent vertical wall surface 655A, 655B of the inlet end portion 655 when inserted into their associated passageways or bore 652, 653. The arrangement is such that the orientation of the respective wire or cable retainers 656, 660 relative to their respective passageways or bores are predetermined. As previously described, the respective wire or cable retainers are proportioned and sized so as to be press fitted or frictionally fitted within their corresponding bore or passageway 653, 653 in a manner to withstand any unintentional separation of the cable retainer from its corresponding bore. In all other respects, the construction and function of the internal wire or cable retainer is similar to that hereinbefore described with respect to FIGS. 13 and 18.

Figure 50:
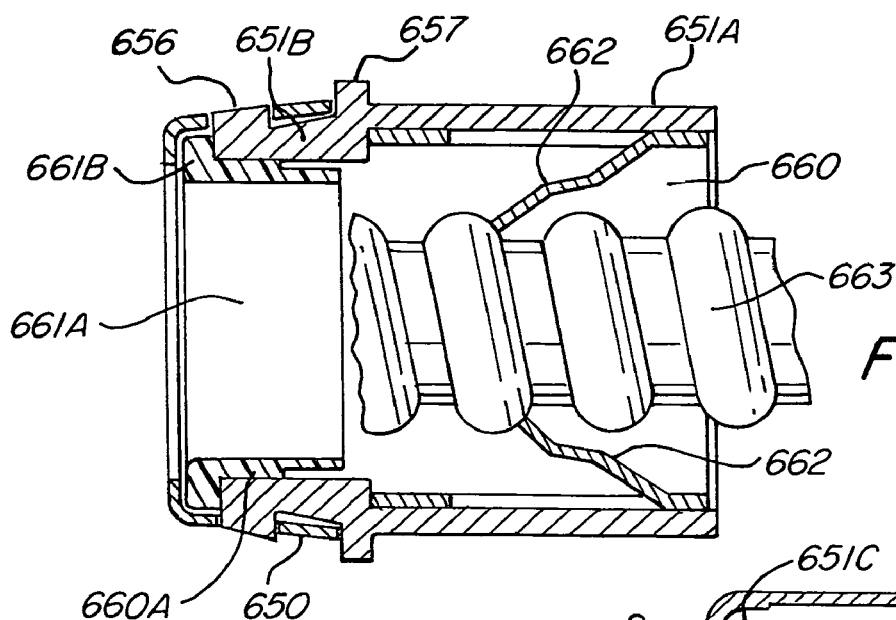
FIG. 50 is a sectional side view of the electrical duplex connector assembly of FIG. 46 in the assembled position of the component parts.
Figure 51:
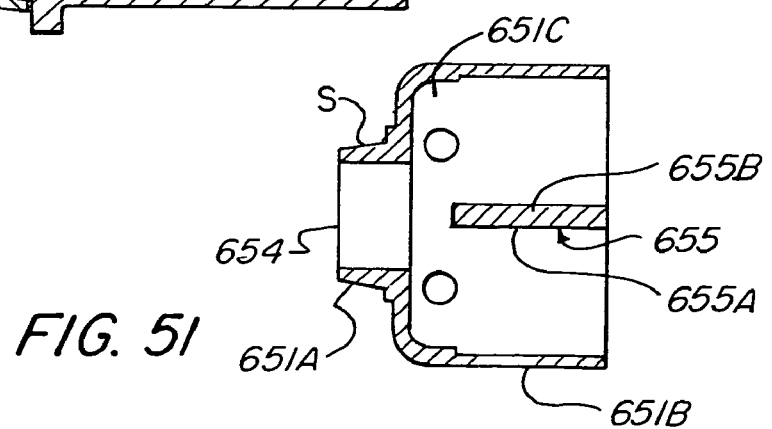
FIG. 51 is a sectional view on a reduced scale of the connector body taken along section line 51-51 on FIG. 46.

As noted in FIGS. 46 and 50, the connector assembly 650 includes a bushing 661, constructed preferably of a plastic non-conducting material arranged to be inserted in the outlet opening 654 of the connector body 651. The bushing 661 includes a cylindrical body portion 661A sized and shaped so as to complement the internal surface of the outlet opening 654 with a friction or press fit. The leading end of the bushing 661 is provided with a radially outwardly extending flange 661B which functions as a stop to limit the insertability of the bushing 661 within the outlet end opening 654.

In the assembled position of the respective component parts, it will be noted that the bushing 661 is inserted and secured within the outlet end opening 654 before the frustro-conical external retainer 650 is secured about the outlet end portion 651B of the connector body. Thus, the engagement of the frustro-conical retainer 650 with the retainer lugs 656 insures that the bushing 661 is prevented from being separated from the outlet opening as it is firmly sandwiched between the outlet opening 654 of the connector body 651 and the frustro-conical retainer 650 secured to the outlet end portion 651B.

As the cable retainers 659, 660 are provided with forwardly inclined retaining tangs 662, the respective cable or wire conductors 663 can be readily secured thereto simply by inserting the cable or wire conductor into the respective inlet passageways whereby the retaining tangs permit only unidirectional insertion while resisting an opposing force applied to the cable or wire conductor so as to prohibit any unintentional separation of the cable or wire conductor from the connector body 651.

The simplicity of a duplex connection having a unitary connector body construction provided with an outer frustro-conical retainer for securing the same with a snap fit locking arrangement to an electric box or panel, and the ease by which a wire conductor can be secured to a connector body utilizing the described internal cable retainers enhances the ease of manufacture and assembly of such connectors to result in substantial savings of labor and costs for producing the same, while enhancing the ease of use of such connectors in the field which further aids to minimize the time, effort and labor required to install the same.

While the present invention has been described with respect to several embodiments, it will be understood that various modifications may be made without departing from the spirit or scope of the invention.

What is claimed is:

1. An electrical connector assembly comprising:
a connector body having an outlet end portion and an inlet end portion,
said outlet end portion defining an outlet opening, and said inlet end portion defining an inlet opening,
a non-conducting bushing having a cylindrical body portion frictionally fitted within said outlet opening,
said bushing having a radially outwardly extending flange that limits the insertability of said cylindrical body portion within said outlet opening,
a frusto-conical retainer circumscribing said outlet end portion,
means for securing said frustro-conical retainer onto said outlet end portion so that said bushing is sandwiched between said frustro-conical retainer and said outlet opening, whereby said bushing is prevented from being separated from said outlet opening by said frustro-conical retainer, and
a unidirectional cable retainer secured within said inlet end portion.

2. An electrical connector assembly comprising:
a connector body having an outlet end portion and an inlet end portion,
said outlet end portion defining an outlet opening, and said inlet end portion defining an inlet opening,
a non-conducting bushing having a cylindrical body portion frictionally fitted within said outlet opening,
said bushing having a radially outwardly extending flange that limits the insertability of said cylindrical body portion within said outlet opening,
a frusto-conical retainer circumscribing said outlet end portion,
means for securing said frustro-conical retainer onto said outlet end portion whereby said bushing is sandwiched between said frustro-conical retainer and said outlet opening,
a unidirectional cable retainer secured within said inlet end portion,
wherein said inlet end portion of said connector body defines a pair of inlet passageways,
said passageways being disposed in side by side relationship within said inlet end portion, and having a common wall partition separating said side by side passageways, and
a transition portion connecting said pair of passageways within said inlet end portion in communication with said outlet end portion wherein said outlet end portion, inlet end portion defining said pair of inlet passageways, and said interconnecting transition portion being integrally connected to one another to define a unitary member.

3. An electrical connector assembly as defined in claim 2 wherein said wall partition having opposing flat wall surfaces that are parallel to one another.

4. An electrical connector assembly as defined in claim 3 wherein said frusto-conical, retainer includes a leading end, a trailing end and an intermediate portion therebetween, and said leading end includes a face portion having a central opening disposed in alignment with said outlet opening whereby said bushing flange is sandwiched between said face portion and said outlet end portion.

5. A duplex electric connector assembly comprising:
a connector body having an outlet end portion and an inlet end portion,
said outlet end portion defining a single outlet opening,
said inlet end portion having at least a pair of inlet passageways disposed in side by side relationship,
a partition wall separating each of the inlet passageways,
a transition section connecting said pair of passageways in communication with said outlet opening,
said outlet end portion, inlet end portion, said partition wall and said transition sections being integrally formed as a metal casting,
a radially outwardly extending stop flange circumscribing said connector body between said inlet end portion and said outlet end portion,
an outer retaining ring circumscribing said outlet end portion,
means on said outlet end portion for retaining said outer retainer ring onto said outlet end portion,
said retaining ring including locking tangs circumferentially spaced about the outer surface of said retaining ring,
said locking tangs being blanked and cantilverely bent out of the surface of said outer retaining ring whereby the free ends of said locking tangs are directed toward said stop flange,
conductor retaining means secured in each of said passageways for effecting unidirectional insertion of an electrical conductor into each of said passageways so as to prohibit unintentional separation of an electrical conductor from said passageway,
said conductor retaining means comprising a sleeve frictionally secured within its corresponding passageway,
and each of said sleeves having opposed inwardly angularly bent tangs directed toward said outlet opening for permitting unidirectional insertion of an electrical conductor into each of said passageways.

6. A duplex connector as defined in claim 5 and including a non-conducting bushing extending into said outlet end opening and said bushing is sandwiched between said outlet end opening and said outer retaining ring, whereby said bushing is prevented from being separated from said outlet end opening by said outer retaining ring.

7. A duplex connector as defined in claim 5 further comprising:
a linear wall surface formed on each of the sleeves comprising said conductor retainer means; and
opposing vertical surfaces formed on said partition wall separating each of the inlet passageways,
whereby said linear wall surfaces and said opposing vertical surfaces engage.

8. A duplex electrical connector assembly comprising:
a unitary connector body integrally formed as a metal casting having an outlet end portion, an inlet end portion and an intermediate transition section connecting said inlet end portion in communication with said outlet end portion,
said outlet end portion having an outlet opening,
said inlet end portion having a pair of side by side inlet passageways,
each of said passageways having an inlet opening,
a partition wall disposed between said side by side passageways, said partition wall having opposed flat wall surfaces, a radially outwardly stop flange circumscribing said connector body between said outlet opening and said passageways inlet openings, said outlet end portion having an outer surface sloping inwardly toward said outlet opening, a frustro-conical shaped outer retainer circumscribing said outer sloping surface, said frustro-conical outer retainer having a face portion having a central opening disposed in alignment with said outlet end opening, means for securing said frustro-conical outer retainer on said outer sloping surface, said frustro-conical outer retainer having a plurality of locking tangs formed out of said surface of said frustro-conical shaped outer retainer, said locking tangs being outwardly bent relative to said surface of said frustro-conical retainer, and a cable retainer sleeve secured within each of said passageways, each of said cable retainer sleeve being generally cylindrical configuration with a flattened side portion, said flattened side portion being disposed to complement said flattened surface of said partition wall in the assembled position, said cable retainer sleeves each including opposed cable retaining tangs blanked out of the surface of its respective cable retainer sleeve, said cable retaining tangs being inwardly bent at an angle relative to the surface of said respective cable retainer sleeve in the direction of said outlet end opening whereby said cable retaining tangs permit insertion of a cable therethrough and prohibits unintentional separation of a cable therefrom, and a non-conducting bushing fitted into said outlet end opening whereby said bushing is sandwiched between said face portion of said frustro conical retainer and said outlet end opening.

9. An electrical connector assembly comprising:

a connector body having an outlet end portion and an inlet end portion, said outlet end portion defining an outlet opening, and said inlet end portion defining an inlet opening, a non-conducting bushing having a cylindrical body portion frictionally fitted within said outlet opening, a frusto-conical retainer circumscribing said outlet end portion, means for securing said frustro-conical retainer onto said outlet end portion, a unidirectional cable retainer secured within said inlet end portion, wherein said inlet end portion of said connector body defines a pair of inlet passageways, said passageways being disposed in side by side relationship within said inlet end portion, and having a common wall partition separating said side by side passageways, and a transition portion connecting said pair of passageways within said inlet end portion in communication with said outlet end portion wherein said outlet end portion, inlet end portion defining said pair of inlet passageways, and said interconnecting transition portion being integrally connected to one another to define a unitary member.

10. A duplex electrical connector assembly comprising:

a unitary connector body integrally formed as a metal casting having an outlet end portion, an inlet end portion and an intermediate transition section connecting said inlet end portion in communication with said outlet end portion, said outlet end portion having an outlet opening, said inlet end portion having a pair of side by side inlet passageways, each of said passageways having an inlet opening, a partition wall disposed between said side by side passageways, said partition wall having opposed flat wall surfaces, a radially outwardly stop flange circumscribing said connector body between said outlet opening and said passageways inlet openings, said outlet end portion having an outer surface sloping inwardly toward said outlet opening, a frustro-conical shaped outer retainer circumscribing said outer sloping surface, said frustro-conical outer retainer having a face portion having a central opening disposed in alignment with said outlet end opening, means for securing said frustro-conical outer retainer on said outer sloping surface, said frustro-conical outer retainer having a plurality of locking tangs formed out of said surface of said frustro-conical shaped outer retainer, said locking tangs being outwardly bent relative to said surface of said frustro-conical retainer, and a cable retainer sleeve secured within each of said passageways, each of said cable retainer sleeve being generally cylindrical configuration with a flattened side portion, said flattened side portion being disposed to complement said flattened surface of said partition wall in the assembled position, said cable retainer sleeves each including opposed cable retaining tangs blanked out of the surface of its respective cable retainer sleeve, and said cable retaining tangs being inwardly bent at an angle relative to the surface of said respective cable retainer sleeve in the direction of said outlet end opening whereby said cable retaining tangs permit insertion of a cable therethrough and prohibits unintentional separation of a cable therefrom.

* * * * *